United States Patent
Pottier et al.

(10) Patent No.: US 10,962,716 B2
(45) Date of Patent: Mar. 30, 2021

(54) MICROELECTROMECHANICALLY ACTUATED DEFORMABLE OPTICAL BEAM STEERING FOR WAVELENGTH TUNABLE OPTICAL SOURCES, FILTERS, AND DETECTORS

(71) Applicant: VALORBEC SOCIETE EN COMMANDITE, Montreal (CA)

(72) Inventors: Pierre Pottier, Montreal (CA); Muthukumaran Packirisamy, Montreal (CA)

(73) Assignee: Valorase, Societe en Cosnitandlte, Montreal (CA)

( * ) Notice: Subject to any disclaimer, the term of this patent is extended or adjusted under 35 U.S.C. 154(b) by 0 days.

(21) Appl. No.: 16/792,442

(22) Filed: Feb. 17, 2020

(65) Prior Publication Data
US 2020/0183089 A1 Jun. 11, 2020

Related U.S. Application Data

(62) Division of application No. 15/992,632, filed on May 30, 2018, now Pat. No. 10,564,358.
(Continued)

(51) Int. Cl.
*G02B 6/293* (2006.01)
*G02B 6/26* (2006.01)
(Continued)

(52) U.S. Cl.
CPC ......... *G02B 6/29314* (2013.01); *G02B 6/262* (2013.01); *G02B 6/2931* (2013.01);
(Continued)

(58) Field of Classification Search
CPC .................................................... G02B 6/3504
See application file for complete search history.

(56) References Cited

U.S. PATENT DOCUMENTS

| | | | | |
|---|---|---|---|---|
| 4,303,302 A | * | 12/1981 | Ramsey | G02B 6/3578 385/22 |
| 4,387,955 A | * | 6/1983 | Ludman | G02B 5/32 356/328 |

(Continued)

*Primary Examiner* — Rhonda S Peace
(74) *Attorney, Agent, or Firm* — Rosenberg, Klein & Lee

(57) ABSTRACT

Wavelength division multiplexing (WDM) has enabled telecommunication service providers to fully exploit the transmission capacity of optical fibers. State of the art systems in long-haul networks now have aggregated capacities of terabits per second. Moreover, by providing multiple independent multi-gigabit channels, WDM technologies offer service providers with a straight forward way to build networks and expand networks to support multiple clients with different requirements. In order to reduce costs, enhance network flexibility, reduce spares, and provide re-configurability many service providers have migrated away from fixed wavelength transmitters, receivers, and transceivers, to wavelength tunable transmitters, receivers, and transceivers as well as wavelength dependent add-drop multiplexer, space switches etc. However, to meet the competing demands for improved performance, increased integration, reduced footprint, reduced power consumption, increased flexibility, re-configurability, and lower cost it is desirable to exploit/adopt monolithic optical circuit technologies, hybrid optoelectronic integration, and microelectromechanical systems (MEMS).

20 Claims, 16 Drawing Sheets

Related U.S. Application Data

(60) Provisional application No. 62/520,159, filed on Jun. 15, 2017, provisional application No. 62/512,205, filed on May 30, 2015.

(51) Int. Cl.
  *G02B 6/34* (2006.01)
  *G02B 6/35* (2006.01)

(52) U.S. Cl.
  CPC ..... *G02B 6/29308* (2013.01); *G02B 6/29313* (2013.01); *G02B 6/29389* (2013.01); *G02B 6/29395* (2013.01); *G02B 6/34* (2013.01); *G02B 6/3504* (2013.01); *G02B 6/3534* (2013.01); *G02B 6/3596* (2013.01); *G02B 6/3508* (2013.01)

(56) References Cited

U.S. PATENT DOCUMENTS

| | | | | |
|---|---|---|---|---|
| 5,078,514 A * | 1/1992 | Valette | ............ | G02B 6/3508 385/16 |
| 6,455,842 B1 * | 9/2002 | Pouteau | ............ | G01J 3/0259 250/227.18 |
| 6,738,539 B2 * | 5/2004 | Hagood | ............ | G02B 6/022 385/16 |
| 6,810,166 B2 * | 10/2004 | Baumann | ............ | G02B 6/3504 385/128 |
| 6,895,161 B2 * | 5/2005 | Romo | ............ | G02B 6/266 385/140 |
| 6,987,898 B2 * | 1/2006 | Tran | ............ | G01N 33/54373 356/73.1 |
| 7,054,519 B1 * | 5/2006 | Novotny | ............ | G02B 6/3508 385/140 |
| 7,082,232 B2 * | 7/2006 | Bona | ............ | G02B 6/3504 385/17 |
| 8,442,368 B1 * | 5/2013 | Reano | ............ | G02B 6/132 385/39 |
| 9,500,827 B2 * | 11/2016 | Hutchison | ............ | G01J 3/0218 |
| 10,564,358 B2 * | 2/2020 | Pottier | ............ | G02B 6/34 |
| 2002/0164128 A1 * | 11/2002 | Nekado | ............ | G02B 6/12014 385/50 |
| 2004/0208422 A1 * | 10/2004 | Hagood | ............ | G02B 6/3504 385/16 |
| 2018/0348436 A1 * | 12/2018 | Pottier | ............ | G02B 6/29308 |
| 2018/0348507 A1 * | 12/2018 | Packirisamy | ...... | G02B 26/0841 |

* cited by examiner

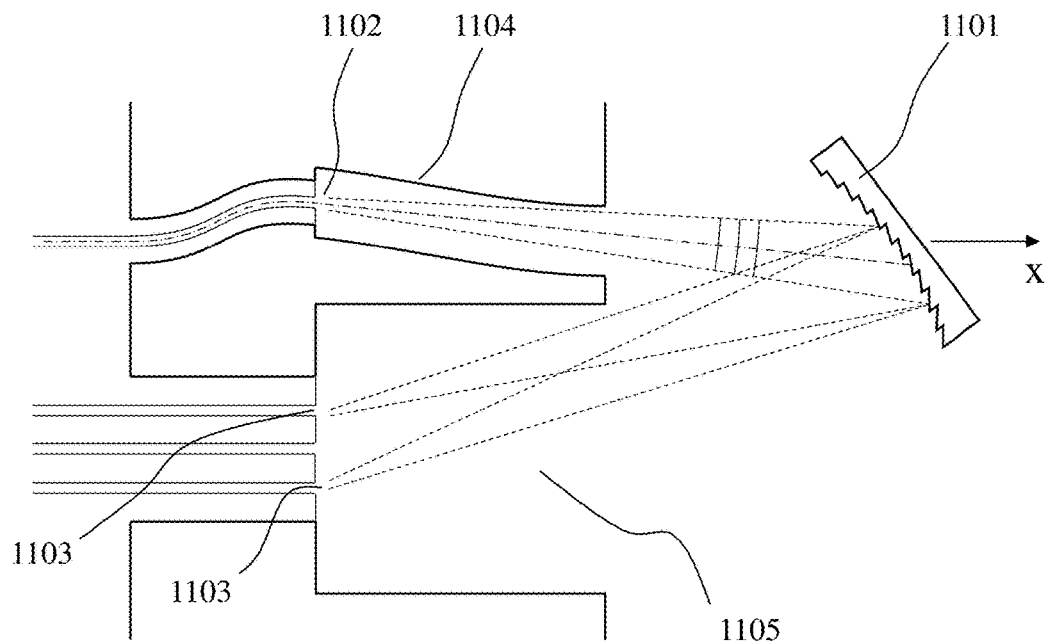
Figure 11
Figure 12
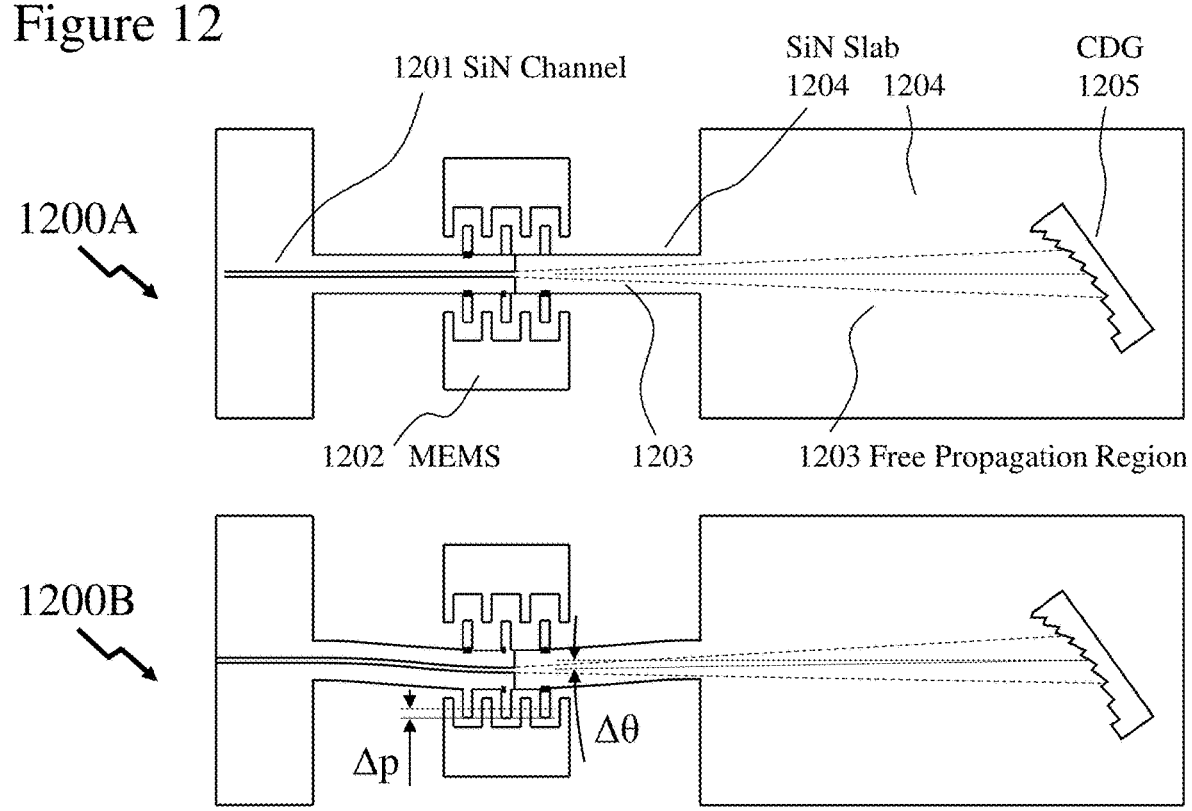

MICROELECTROMECHANICALLY ACTUATED DEFORMABLE OPTICAL BEAM STEERING FOR WAVELENGTH TUNABLE OPTICAL SOURCES, FILTERS, AND DETECTORS

CROSS-REFERENCE TO RELATED APPLICATIONS

This patent application claims the benefit of priority as divisional of U.S. patent application Ser. No. 15/992,632 filed May 30, 2018 entitled "Microelectromechanically Actuated Deformable Optical Beam Steering for Wavelength Tunable Optical Sources, Filters, and Detectors" which claims the benefit of priority from U.S. Provisional Patent Application 62/512,205 filed on May 30, 2017 entitled "Microelectromechanically Actuated Suspended Waveguide Wavelength Tunable Optical Sources, Filters, and Detectors" and U.S. Provisional Patent Application 62/520,159 filed on Jun. 15, 2017 entitled "Microelectromechanically Actuated Deformable Optical Beam Steering for Wavelength Tunable Optical Sources, Filters, and Detectors", the entire contents of each being incorporated herein by reference.

FIELD OF THE INVENTION

This invention relates to microoptoelectromechanical systems (MOEMS) and more particularly to designs for MOEMS based wavelength tunable components such as sources, filters, and detectors exploiting MEMS actuated suspended waveguide structures as the MOEMS element discretely or in combination with other MOEMS elements.

BACKGROUND OF THE INVENTION

Dense wavelength division multiplexing (DWDM) and coarse wavelength division multiplexing (CWDM) have enabled telecommunication service providers to fully exploit the transmission capacity of optical fibers within their networks. Wavelength division multiplexing (WDM) technologies offer service providers not only increased transmission capacity on each fiber but also with flexible and non-intrusive means to expand their networks to support evolving requirements. At the same time WDM has evolved from long haul and ultra-long haul networks to penetrate down into access networks, local area networks and data centers in order to support the continuing inexorable demand for data.

Accordingly, today networks may exploit dynamically configurable wavelength tunable transmitters, receivers, and transceivers as well as wavelength dependent add-drop multiplexers, space switches, filters, etc. However, as optical systems have penetrated access networks and down into data centers competing demands for improved performance, increased integration, reduced footprint, reduced power consumption, increased flexibility, reconfigurability, and lower cost have become stronger such that today the drive within the photonic component community is to replace multiple discrete components and/or hybrid assembles with monolithically integrated circuits.

Silicon based integrated photonics offers a platform for many optical functions through microelectromechanical systems (MEMS) and microoptoelectromechanical systems (MOEMS), silicon waveguides, integrated CMOS electronics and hybrid integration of compound semiconductor elements for optical gain. However, within the prior art the majority of MEMS and MOEMS devices were designed for free space optical interconnections. Accordingly, it would be beneficial to provide optical component designers with MOEMS elements supporting the provisioning of tunable sources, tunable filters, tunable receivers etc. in the optical waveguide domain without free space optics or minimizing waveguide—air—waveguide interfaces.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations in the prior art relating to microoptoelectromechanical systems (MOEMS) and more particularly to designs for MOEMS based wavelength tunable components such as sources, filters, and detectors exploiting MEMS actuated suspended waveguide structures as the MOEMS element discretely or in combination with other MOEMS elements.

In accordance with an embodiment of the invention there is provided an optical device comprising:
a first region in which an optical beam is propagating;
a second region where at least one part of the optical beam is received, for further processing; and
at least one third region between the first and second regions, which is deformable and without physical discontinuities for at least one part of the optical beam; wherein
the deformation of the third region results in the optical beam, received in the second region, having a different orientation and/or position than it initially had.

In accordance with an embodiment of the invention there is provided an optical device comprising:
a substrate having formed upon it a layer structure comprising a plurality of layers;
a deformable structure formed within a first predetermined portion of the layer structure contiguous and continuous between a second predetermined portion of the layer structure at a first predetermined location on the substrate and a third predetermined portion of the layer structure at a second predetermined location on the substrate of which a predetermined portion supports propagation of an optical beam within a subset of the first predetermined portion of the layer structure; and
an optical component formed within a second predetermined portion of the layer structure in a third predetermined location on the substrate; wherein
deformation of the deformable structure results in the optical beam coupling to the optical component with at least one of a different orientation and a different position to that when the deformable structure is undeformed; and
the optical component properties are dependent on at least one of the orientation and position of the optical beam coupled to it.

In accordance with an embodiment of the invention there is provided an optical device comprising:
a three-dimensional (3D) waveguide coupled to a first end of a continuous structure that is deformable;
an optical component coupled to a second distal end of the deformable structure; wherein
an optical beam coupled to the optical component from the 3D waveguide via the deformable structure has at least one of a different orientation and a different position with respect to the optical component to that when the deformable structure is undeformed; and the optical component properties are dependent on at least one of the orientation and position of the optical beam coupled to it.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 11 depicts a reflecting diffraction element in conjunction with a MEMS actuated suspended waveguide beam according to an embodiment of the invention;

FIG. 12 depicts a reflecting diffraction element in conjunction with a MEMS actuated suspended waveguide beam according to an embodiment of the invention in the Littrow configuration;

DETAILED DESCRIPTION

Figure 1:
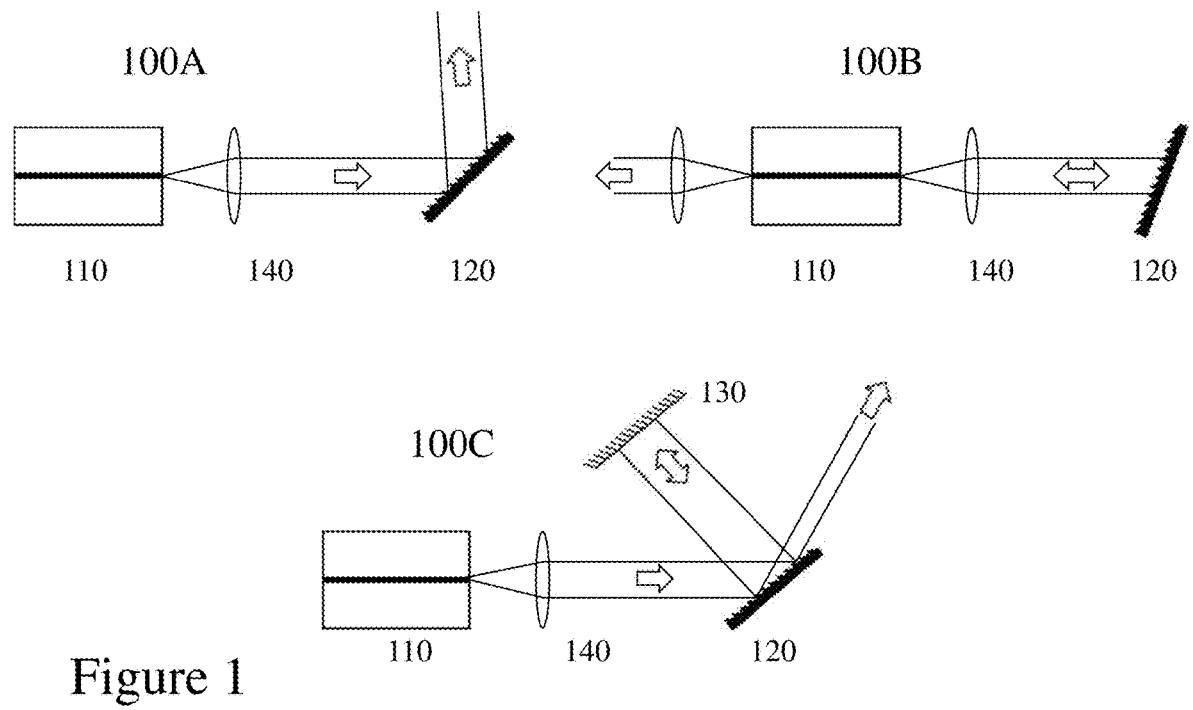
FIG. 1 depicts schematics of tunable optical sources exploiting diffraction gratings within "transmissive" Littrow, reflective Littrow, and transmissive Littman-Metcalf configurations as known in the prior art for bulk and micro-optic implementations.

The present invention is directed to microoptoelectromechanical systems (MOEMS) and more particularly to designs for MOEMS based wavelength tunable components such as sources, filters, and detectors exploiting MEMS actuated suspended waveguide structures as the MOEMS element discretely or in combination with other MOEMS elements.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments. It would also be evident that an embodiment may refer to a method or methods of manufacturing a device rather than the actual design of a device and that vice-versa an embodiment of the invention may refer to a device or devices rather than the method or methods of manufacturing.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, method, or characteristic "may", "might", "can" or "could" be included, that particular component, feature, structure, or characteristic is not required to be included. It would also be evident that an embodiment and/or the phraseology and/or terminology may refer to a method or methods of manufacturing a device rather than the actual design of a device and that vice-versa an embodiment and/or the phraseology and/or terminology may refer to a device or devices rather than the method or methods of manufacturing.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, methods, components or groups thereof do not materially alter the basic and novel characteristics of the claimed composition, device or method. If the specification or claims refer to "an additional" element, that does not preclude there being more than one of the additional element or method.

An "optical waveguide" as used herein, and throughout this disclosure, refers to a structure that confines electromagnetic radiation within a predetermined wavelength range. This includes, but is not limited, to the visible wavelength range (typically defined as 400 nm≤λ≤700 nm) and near infra-red (IR) (700 nm≤λ≤1650 nm) including telecommunication bands such as O-band (1260 nm≤λ≤1360 nm), S-band (1460 nm≤λ≤1530 nm), C-band (1530 nm≤λ≤1565 nm), and L-band (1565 nm≤λ≤1625 nm). However, optical waveguides may also support waveguiding of optical signals within the near ultra-violet (UV), far UV, mid-IR, and far IR according to the waveguide materials, waveguide design etc.

A "channel" waveguide as used herein, and throughout this disclosure, refers to a three-dimensional (3D) waveguide that confines the optical radiation (optical signal) laterally, vertically and directs the propagation within the waveguide.

A "slab" or "planar" waveguide as used herein, and throughout this disclosure, refers to a two-dimensional (2D) waveguide that confines the optical radiation (optical signal) vertically but not within the lateral or forward propagating directions.

A "passive" waveguide as used herein, and throughout this disclosure, refers to section of an optical waveguide or an optical waveguide having material characteristics that vary according to the intrinsic properties of the material from which the passive waveguide is formed.

An "active" waveguide as used herein, and throughout this disclosure, refers to a section of an optical waveguide or an optical waveguide supporting modification of an optical characteristic through the application of an electrical current or voltage in addition to intrinsic variations such as refractive index with temperature. Electrical current or voltage being applied via semiconductor junctions, p-n junctions, p-i-n junctions, quantum structures, and quantum dots for example. Such structures can comprise single or multiple quantum structures and junctions to generate single or multiple wavelengths and combinations thereof.

A "compound semiconductor" or "semiconductor" as used herein, and throughout this disclosure, refers to a material having an electrical conductivity value falling between that of a conductor and an insulator wherein the material may be an elemental material or a compound material. A semiconductor may include, but not be limited to, an element, a binary alloy, a tertiary alloy, and a quaternary alloy. Structures formed from a semiconductor or semiconductors may comprise a single semiconductor material, two or more semiconductor materials, a semiconductor alloy of a single composition, a semiconductor alloy of two or more discrete compositions, and a semiconductor alloy graded from a first semiconductor alloy to a second semiconductor alloy. A semiconductor may be undoped (intrinsic), p-type doped, n-typed doped, graded in doping from a first doping level of one type to second doping level of the same type, or grading in doping from a first doping level of one type to a second doping level of a different type. Semiconductors may include, but are not limited to:

Elements, such as certain group IV and group VI elements, e.g. silicon (Si) and germanium (Ge), and binary group IV alloys, e.g. silicon germanium (SiGe) and silicon carbide (SiC);

III-V semiconductors, such as those between aluminum (Al), gallium (Ga), and indium (In) with nitrogen (N), phosphorous (P), arsenic (As) and tin (Sb), including for example GaN, GaP, GaAs, InP, InAs, AlN and AlAs; and Organic semiconductors, which may include single molecules oligomers, organic polymers, and polycyclic aromatic hydrocarbons.

A "semiconductor optical emitter" (SOE) as used herein, and throughout this disclosure, refers to an electrically pumped semiconductor device in which the active optically emitting medium is formed by a p-n junction of a semiconductor diode. If the semiconductor optical emitter is formed within a cavity having low optical reflectivity the SOE will provide optical gain (amplification) providing a "semiconductor optical amplifier" (SOA). If formed within a cavity having high reflectivity, then the SOE will provide optical gain for spontaneous emission from the SOE within the wavelength range defined by the characteristics of the SOE and the high reflectivity facets thereby forming a laser diode.

A: EXTERNAL CAVITY DIODE LASER

An "external cavity diode laser" (commonly referred to as an ECL) employs a SOA with one high reflectivity facet and a second high reflectivity facet formed from a tunable wavelength component such as a diffraction grating, for example. Examples of ECL devices are depicted in first to third schematics 100A to 100C respectively in FIG. 1 which depict "transmissive" Littrow, reflective Littrow, and transmissive Littman-Metcalf configuration. In each the SOE 110 is coupled to a diffraction grating 120 which is either tuned directly, e.g. transmissive and reflective Littrow configurations 100A and 100B, or indirectly, e.g. via rotating mirror 130. Within the prior art ECLs have primarily exploited free-space optical assemblies as depicted by the lenses 140 which couple the SOE to a collimated beam which is routed to the diffraction grating 120. Some fiber based ECLs within the prior art exploit tunable distributed Bragg reflectors. Hybrid integrated ECLs exploiting waveguide based distributed Bragg gratings have included Jeong et al. in "Over 26 nm Wavelength Tunable External Cavity Lasers based on Polymer Waveguide Platforms for WDM Networks" (IEEE Phot. Tech. Lett., Vol. 18(2), pp 2102-2104) which exploits thermo-optic control of a polymer waveguide Bragg to provide wavelength tuning and Menard et al. in World Patent Publication WO/2015/131270 entitled "Methods and System for Wavelength Tunable Optical Components and Sub-Systems" exploit a MEMS mirror to address a waveguide Bragg grating within an array of waveguide Bragg gratings.

Whilst the former polymer waveguides provide a low complexity optical waveguide solution their tuning is slow, due to thermo-optic effect, and their wavelength alignment to any system requires an additional wavelength locker. In contrast the MEMS mirror solution offers faster switching to a new wavelength and the substantially reduced thermo-optic effect in the silicon dioxide ($SiO_2$) or silicon nitride ($Si_3N_4$) on silicon waveguides. However, the inventors have established a range of other MOEMS based designs that provide tunable wavelength characteristics such as within a tunable ECL. These designs in different embodiments support wavelength scanning, such as applicable in optical spectrometry, as well as programmable discrete wavelengths such as applicable to spectrometry and optical networks. Whilst some embodiments of the invention below are described below with respect to an ECL optical source it would be evident to one of skill in the art that the MOEMS plus optical waveguide geometries presented in respect of FIGS. 2 to 20 may also be employed in wavelength tunable receivers, reconfigurable optical add—drop multiplexers (ROADMs), wavelength selective optical switches, and other wavelength selective structures, for example either directly or in combination with other optical elements such as circulators, directional couplers, etc.

B: MICROELECTROMECHANICALLY ACTUATED SUSPENDED OPTICAL WAVEGUIDE COUPLING ELEMENTS

Within embodiments of the invention the inventors have developed devices exploiting a deformable structure to geometrically modify distances and angles between points while at the same time using optical beams, whether guided, or not, and the fact that these optical beams will respectively follow, or not, this geometrical deformation, resulting in controllable position and angle of the optical beam at reception points.

Further, embodiments of the invention exploit novel integration methods involving a concave diffraction grating (CDG), MEMS elements, channel (3D) and planar (2D) waveguides, and distributed Bragg reflector (DBR) on a single planar chip in a configuration such as to realize the function of wavelength selection. Additionally, connecting to a laser gain medium, e.g. an optical amplifier exploiting low reflectivity facets on a semiconductor laser diode, allows creation of semi-integrated tunable lasers. Therefore, advantages of embodiments of the invention include: wide tunability, fast response compared to the common heated mount temperature control diode laser, low consumption, small size, planar chip, and low cost.

Embodiments of the invention may be employed within diverse fields including, but not limited to, optical switching, optical interconnects, laser scanning, free space optical communications, optical sensors, tunable lasers as well as mechanical vibration sensing, accelerometers, gyroscopes, sensing devices, diagnosis, optical modulation, e.g. acousto-optic modulation, optical coherence tomography (OCT), and interferometry.

Embodiments of the invention can be directly exploited within semi-integrated tunable lasers for WDM or any other transmission of data. It can also be used for semi-integrated tunable laser for spectroscopy, gas or bio-sensing, e.g. as part of so-called "lab-on-a-chip" systems. Additionally, it can operate as a (tunable) optical filter, or as a scanning spectrometer.

Future possibilities will be a fully integrated version with the laser gain medium on the same chip, with additional applications where compactness, power consumption, or price are still a limiting factor, e.g. for hand-held devices, or for vast deployment of small datacom networks requiring a selectable source.

Figure 2:
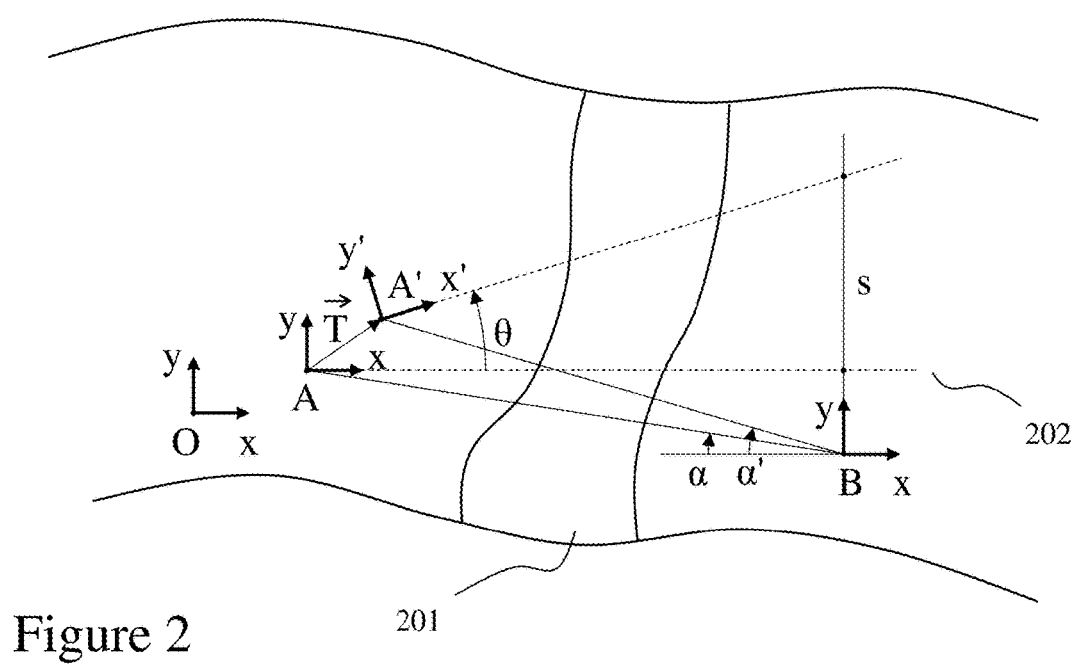
FIG. 2 depicts the relationships between position and angle of an optical beam within a MEMS actuated suspended waveguide according to an embodiment of the invention.

Embodiments of the invention consists of an optical and mechanical device, where the position and the angle of an optical beam can be controlled. Referring to FIG. 2 consider two points $A(x_A, y_A)$ and $B(x_B, y_B)$ in a referential plane $O_{xy}$ of origin O, with at least one deformable region 201 between the two points A and B. An optical beam emanating from A will propagate and be received in the region of B. The optical beam axis 202 crosses A and is oriented along x. The optical beam may be a diverging beam, a converging beam, a collimated beam, or a beam issued from a point source. It may for example be a beam launched from a waveguide. By deforming at least one deformable region between A and B, the referential A(x, y) gets transformed into A'(x', y'). The deformation can be decomposed in a translation of vector $T(T_x, T_y)$=AA' and the rotation of angle θ. The referential B(x, y) is considered here as fixed. This results in a shift s and rotation r of the optical beam in B(x, y) as defined by Equations (1) and (2) respectively the optical beam shift being the change in position of the point of intersection of the optical beam axis with ($B_y$).

$$s = T_y + (x_B - x_A - T_x) \tan\theta \quad (1)$$

$$r = \theta \quad (2)$$

Also, the angle of incidence of the source A on B changes from α to α' as given by Equations (3) and (4) respectively.

$$\alpha = \arctan\frac{y_A - y_B}{x_A - x_B} \quad (3)$$

$$\alpha' = \arctan\frac{T_y + y_A - y_B}{T_x + x_A - x_B} \quad (4)$$

The region 201 between A and B may contain one or more elements to control the optical beam, such as (i) waveguides, (ii) lenses, (iii) concave, convex, or flat mirrors (e.g. Bragg mirrors) that could be used to focus, collimate, or reflect a beam, e.g. with a parabolic or elliptical shape, or (iv) diffraction gratings to disperse the wavelengths angularly.

What has just been described concerns a 2D situation, which is particularly relevant to integrated optics, where a planar or slab waveguide can be used to confine light in the third dimension, thereby reducing a 3D problem into a 2D one, where light might be guided laterally or not. Nevertheless, the situation can be generalized to a 3D problem where the positions and the angles of an optical beam can be controlled in the three dimensions.

Further, devices according to embodiments of the invention may be used in both optical directions, forward or backward, e.g. from a waveguide to a laterally-free optical beam or from a laterally-free optical beam to a waveguide.

Figure 3:
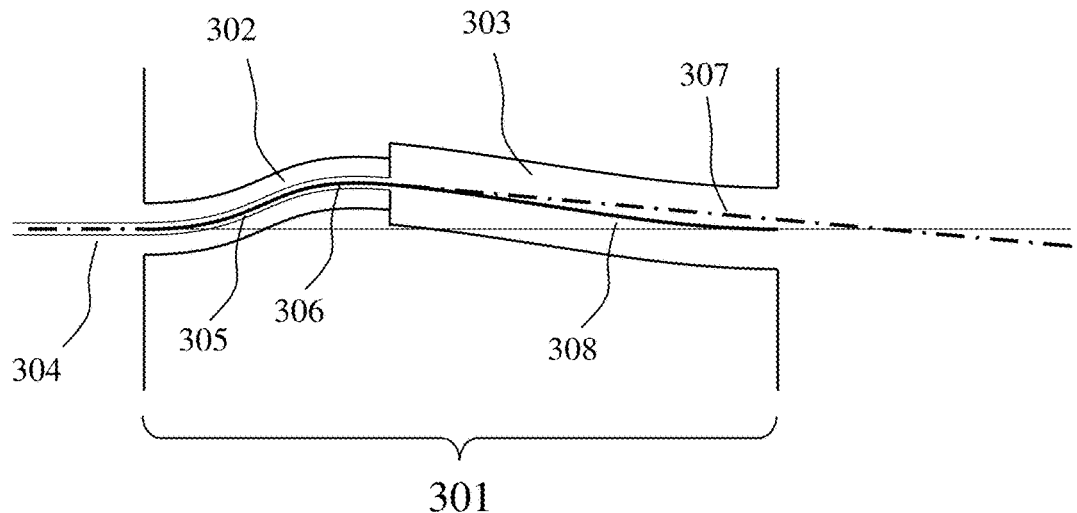
FIG. 3 depicts a MEMS actuated suspended waveguide according to an embodiment of the invention.

Within an embodiment of the invention, there is provided a deformable mechanical beam 301 on which an optical beam is propagating as depicted in FIG. 3. The optical beam may be vertically guided, such as within a slab or planar waveguide. Within a first region 302 of the mechanical beam, the optical beam is laterally-guided, using e.g. a channel waveguide 304. On a second region 303 of the mechanical beam, the optical beam is laterally-free, meaning it is not guided laterally, e.g. it is diverging or is collimated. In the first region, the optical beam axis 305 will follow the mechanical beam axis 306 during the deformation of the mechanical beam, whereas in the second region, the optical beam axis 307 will be independent of the mechanical beam axis 308. A decoupling of the optical beam axis from the mechanical beam axis is thus obtained. This results in a shift in position and a change in angle of the optical beam axis. Between the first and the second region a transition occurs between the laterally-guided to the laterally-free region. This transition can within embodiments of the invention be abrupt (e.g. waveguide end), by a series of steps, or continuous (e.g. a horn shape mode converter). The stress produced in the material of the deformed mechanical beam may also be used to control the optical beam through elasto-optic effects. The mechanical beam may contain one or several sections with different sizes, materials, with abrupt or continuous changes resulting in a freeform beam. The boundary conditions of the mechanical beam may be the usual ones found in mechanics, such as built-in, cantilever, simply supported, free, etc. and there may be multiple supports. The force applied to the beam to deform it may be local, at several places with different directions and intensity, distributed uniformly or not, linear or rotational.

Figure 4:
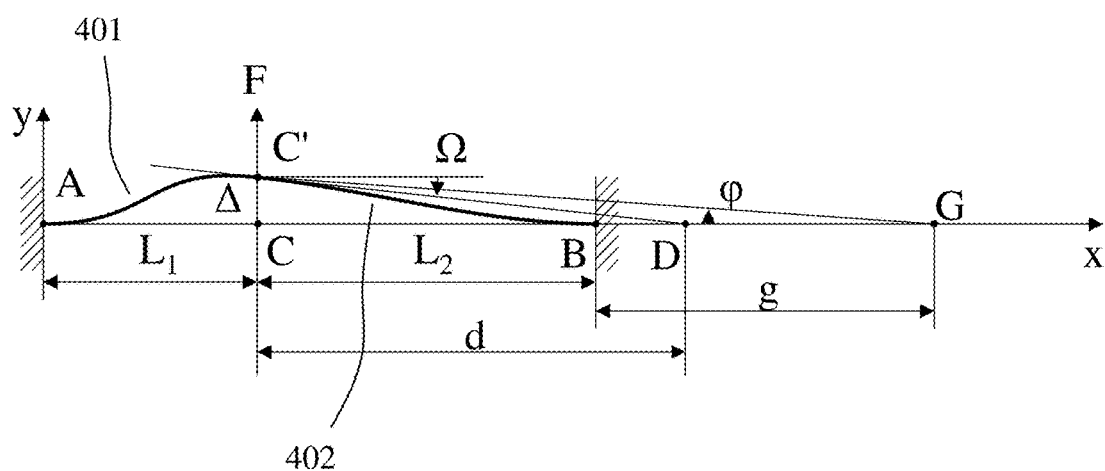
FIG. 4 depicts a MEMS actuated suspended waveguide beam according to an embodiment of the invention comprising first and second sections according to an embodiment of the invention.

Referring to FIG. 4 within another embodiment of the invention, the deformable mechanical beam is a built-in beam with two sections 401 and 402 of lengths $L_1$ and $L_2$ of second moments of area $I_1$ and $I_2$. A force of magnitude F is applied at the connection point C between the two sections. It can be shown that for small displacements the deflection of the beam at C is given by Equation (5) where E is the Young's modulus of the beam material, and the angle is given by Equation (6).

$$\Delta = \frac{FL_1^3 L_2^3}{3E} \frac{I_1 L_2 + I_2 L_1}{I_1^2 L_2^4 + 4I_1 I_2 L_1 L_2^3 + 6I_1 I_2 L_1^2 L_2^2 + 4I_1 I_2 L_1^3 L_2 + I_2^2 L_1^4} \quad (5)$$

$$\Omega = \frac{FL_1^2 L_2^2}{2E} \frac{I_1 L_2^2 - I_2 L_1^2}{I_1^2 L_2^4 + 4I_1 I_2 L_1 L_2^3 + 6I_1 I_2 L_1^2 L_2^2 + 4I_1 I_2 L_1^3 L_2 + I_2^2 L_1^4} \quad (6)$$

$$I = \frac{hb^3}{12} \quad (7)$$

For a rectangular cross-section beam, the second moments of area I is given by Equation (7) where h is the beam height and b the width, with the displacement being lateral.

Figure 5:
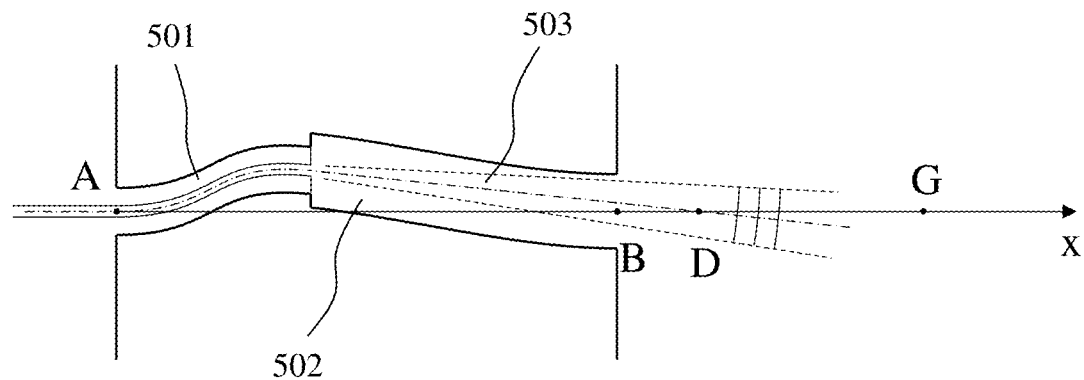
FIG. 5 depicts a MEMS actuated suspended waveguide beam according to the design basis of FIG. 4 with laterally guided and laterally unguided first and second sections according to an embodiment of the invention.

Referring to FIG. 5 there is depicted an optical beam 503 which is laterally-guided in the first section 501 and laterally-free in the second section 502 and will therefore be shifted by the value Δ, and rotated of the value Ω, as evident with reference to FIG. 4. At a given point G at a distance g from point B, the angle of incidence φ of the optical source emanating from C', the displaced point C, is thereby given by Equation (8). This equates to the optical source at C' as seen from G coming at an angle φ.

$$\varphi \approx \tan\varphi = \frac{-\Delta}{L_2 + g} \quad (8)$$

It is possible to keep the orientation of the optical beam axis towards a given point D at a distance d from point C, i.e. D will be on the optical beam axis. This implies the condition of Equation (9) which therefore leads to the condition defined in Equation (10).

$$\Omega \approx \tan\Omega = \frac{-\Delta}{d} \quad (9)$$

$$3d(I_1 L_2^2 - I_2 L_1^2) + 2L_1 L_2(I_1 L_2 + I_2 L_1) = 0 \quad (10)$$

Three of the four variables $I_1$, $I_2$, $L_1$ and $L_2$ can be freely chosen but the final one is deduced from the others according to Equations (11) to (14) respectively with the condition defined by Equation (15).

$$I_1 = \frac{I_2 L_1^2}{L_2^2} \frac{3d - 2L_2}{3d + 2L_1} \quad (11)$$

$$I_2 = \frac{I_1 L_2^2}{L_1^2} \frac{3d + 2L_1}{3d - 2L_2} \quad (12)$$

$$L_1 = \frac{I_1 L_2^2 + L_2\sqrt{I_1^2 L_2^2 + 3I_1 I_2 d(3d - 2L_2)}}{I_2(3d - 2L_2)} \quad (13)$$

$$L_2 = \frac{-I_2 L_1^2 + L_1\sqrt{I_2^2 L_1^2 + 3I_1 I_2 d(3d + 2L_1)}}{I_1(3d + 2L_1)} \quad (14)$$

$$d > \frac{2L_2}{3} \quad (15)$$

Figure 6:
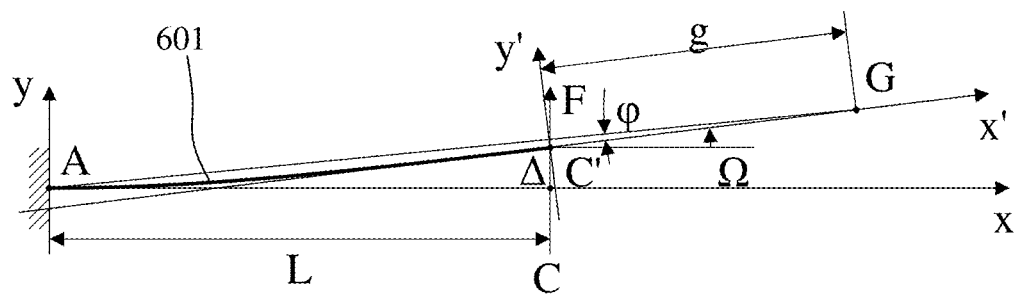
FIGS. 6 and 7 depict a MEMS actuated suspended waveguide beam to an embodiment of the invention laterally guided prior to and laterally unguided within the suspended waveguide.

Within another embodiment of the invention, as depicted in FIG. 6, the deformable mechanical beam is a cantilever 601 of length L, second moment of area I, and Young's modulus E. A force of value F is applied at its end point C. It can be shown that for small displacements the deflection of the beam at C is given by Equation (16) and the angle is given by Equation (17).

$$\Delta = \frac{FL^3}{3EI} \quad (16)$$

$$\Omega = \frac{FL^2}{2EI} \quad (17)$$

Figure 7:
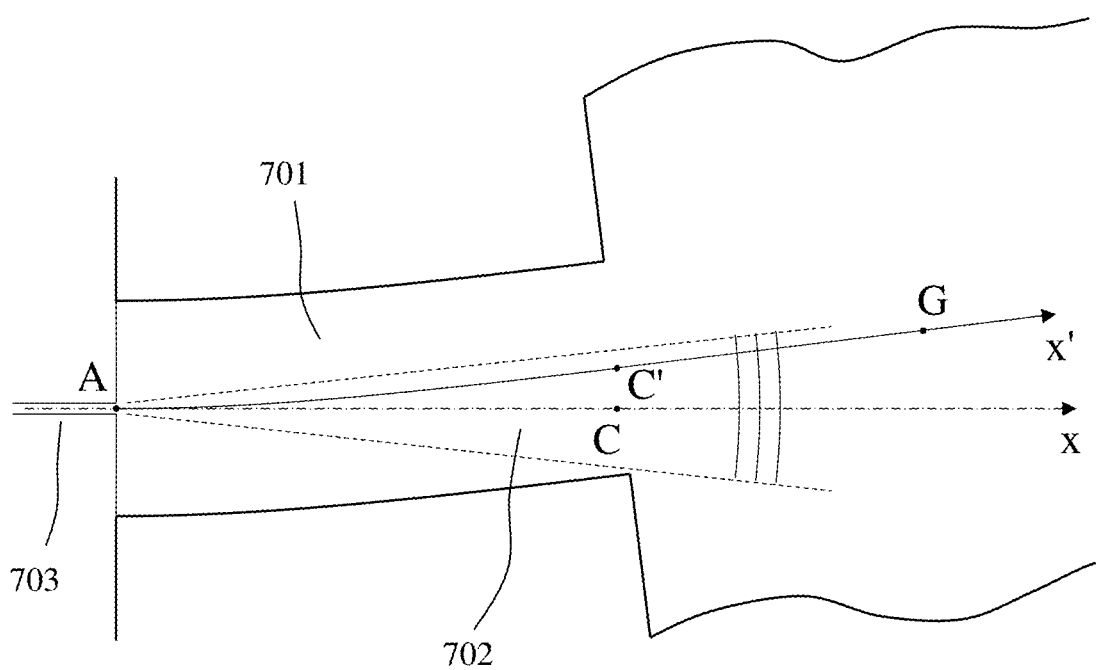

An optical beam 702 laterally-guided in the initial section 703 before entering the mechanical beam and laterally-free in the mechanical beam 701 will therefore be shifted of the value $$\frac{-\Delta}{\cos\Omega} \approx -\Delta,$$

and rotated of the value $-\Omega$ in the referential C' (x' y') where C' is the displaced point C, and the axis x' is tangential to the mechanical beam at C' as depicted in FIGS. 6 and 7.

In the referential C' (x' y'), at a given point G distant of g from point C', it can be shown from geometrical considerations that the angle of incidence, φ, of the optical source emanating from A is given by Equation (18), i.e. in the referential C'(x' y'), the optical source at A is seen from G coming at an angle φ, see FIG. 6.

$$\varphi \approx \frac{-\Delta}{2(L+g)} \quad (18)$$

Figure 8:
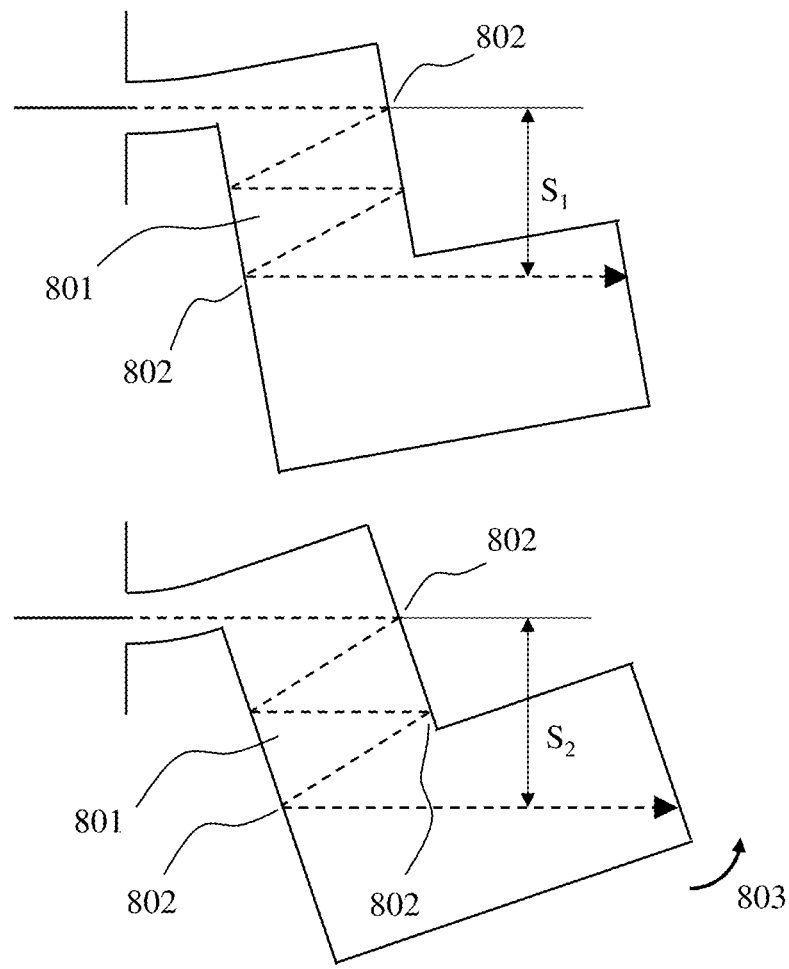
FIG. 8 depicts an optical element for use in conjunction with a MEMS actuated suspended waveguide beam according to an embodiment of the invention to "amplify" the optical beam displacement prior to coupling it to another optical element.

In another embodiment of the invention, a part 801 of the region between points A and B of FIG. 2, which may be deformable or not, is used to reflect the optical beam, possibly several times, in a mainly folded way, to amplify the optical beam displacement as depicted in FIG. 8. The reflections 802 may be obtained with Bragg mirrors. The region part 801 may have its sides flat, angled, or curved such as for focusing or collimating the optical beam, and may be displaced or rotated by actuation 803.

Figure 9:
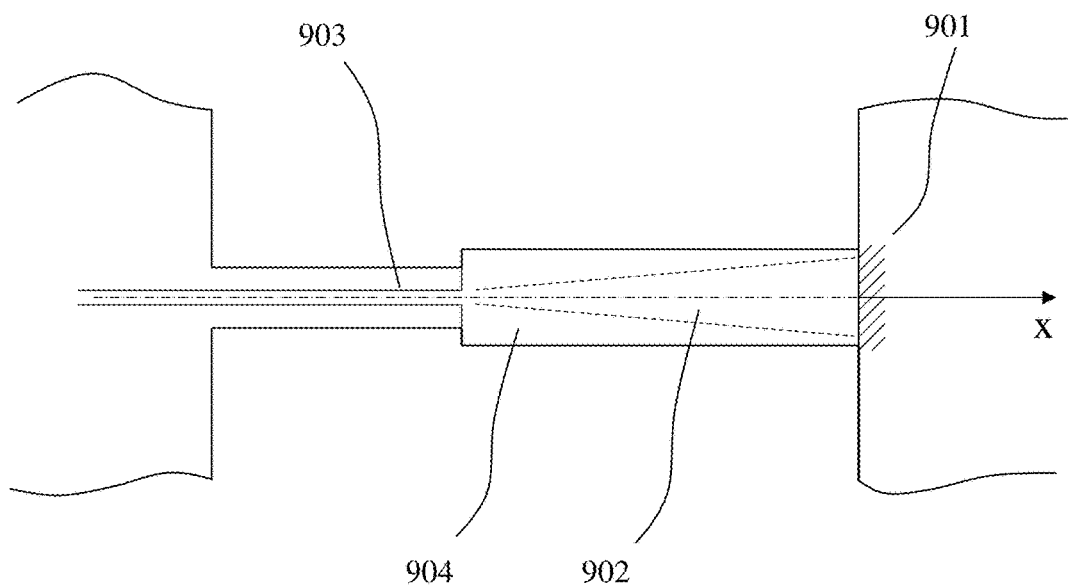
FIG. 9 depicts a planar reflective element in conjunction with a MEMS actuated suspended waveguide beam according to an embodiment of the invention.
Figure 10:
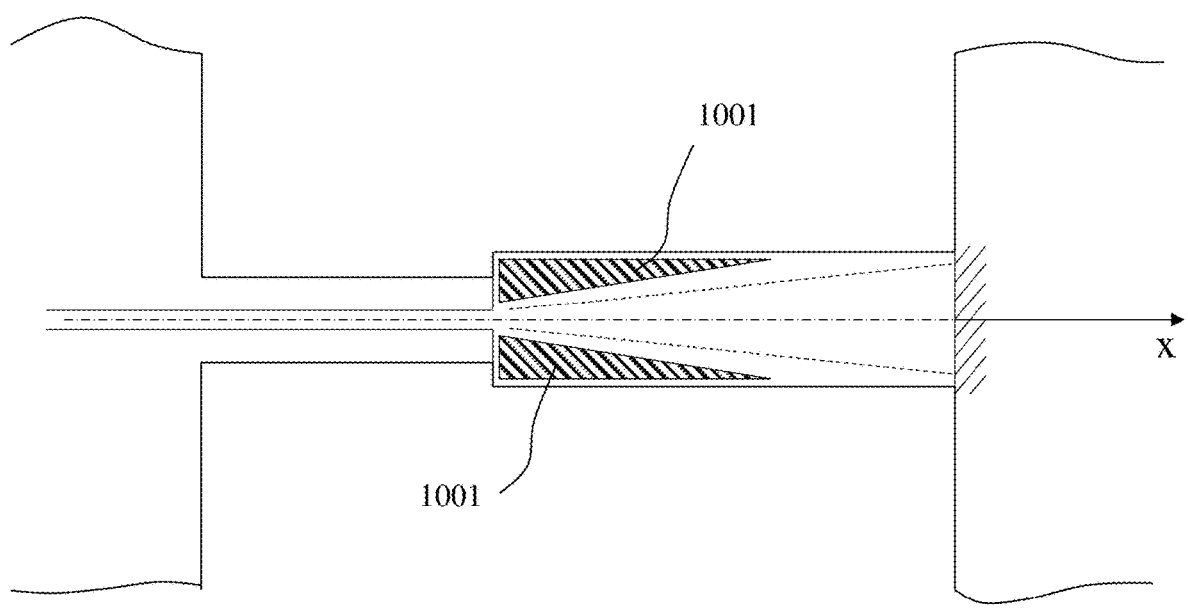
FIG. 10 depicts the configuration of FIG. 9 with additional elements such as Bragg mirrors, photonic crystals or "spoilers" to remove unwanted optical signals in the regions these are employed.

In another embodiment of the invention, a mirror is used in association with the deformable region such as depicted in FIG. 9. The mirror 901 is placed after the optical beam expansion 902 originating from a waveguide 903. It may be flat or curved, such as for e.g. refocusing into the input waveguide. It may also be a corner reflector mirror. The shift of the optical beam due to the deformation of the mechanical part results in more or less light being coupled back into the input waveguide. Such a device can be used as a sensor, e.g. a displacement sensor, an accelerometer, a gyroscope, or a light modulator. The rectangular part 904 between the waveguide and the mirror may be a multimode interferometer (MMI). It may also contain Bragg mirrors or photonic crystals or spoilers 1001 to get rid of unwanted light in these regions as depicted in FIG. 10.

In another embodiment of the invention, a diffraction grating is used in association with the deformable region as depicted in FIG. 11. The diffraction grating 1101, e.g. a concave diffraction grating, can be used to separate wavelengths coming from one or more inputs 1102 into one or more outputs 1103. A deformable region 1104 can be used to tune the angle of incidence of the light on the diffraction grating, see for example equations (4), (8), or (18), resulting in a change of the output wavelengths, according to the diffraction grating equation given in Equation (19) where m is the diffraction grating order, λ the wavelength of light (in vacuum), n the refractive index of the material, a the period of the grating, and α and β the incident and diffracted angles.

$$m\lambda = na(\sin\alpha + \sin\beta) \quad (19)$$

This may be used for changing the range of output wavelengths, or for compensating a wavelength dependence on temperature. At least one deformable region 1105 can alternately be used to tune the output angles of the light from the diffraction grating. At least one deformable region can also be used to tune both the input and output angles. In particular, a mechanical beam arrangement can be used to orientate the optical beam axis towards a particular point of the diffraction grating, such as its pole. The arrangement of FIG. 4 with the specific point D and related conditions given by Equations (11) to (14) provides such an example.

In another embodiment of the invention, the previous embodiment can be used with at least one input waveguide being also the at least one output waveguide, resulting in a retro-diffraction such as in the Littrow condition, as depicted in FIG. 12. This may be used as a wavelength tunable reflector, in particular as an external mirror for an external cavity tunable laser. Accordingly, as depicted in first state 1200A with the MEMS undistorted a silicon nitride channel waveguide 1201 terminates upon the central suspended section of the MEMS 1202 such that the beam 1203 propagates within the silicon nitride slab waveguide regions 1204 to and from the CDG 1205. Activation of the MEMS 1202 leads to a lateral movement of the central beam of the MEMS 1202 such that an offset of Δp yields Δθ rotation in launch to the CDG 1205.

Figure 13:
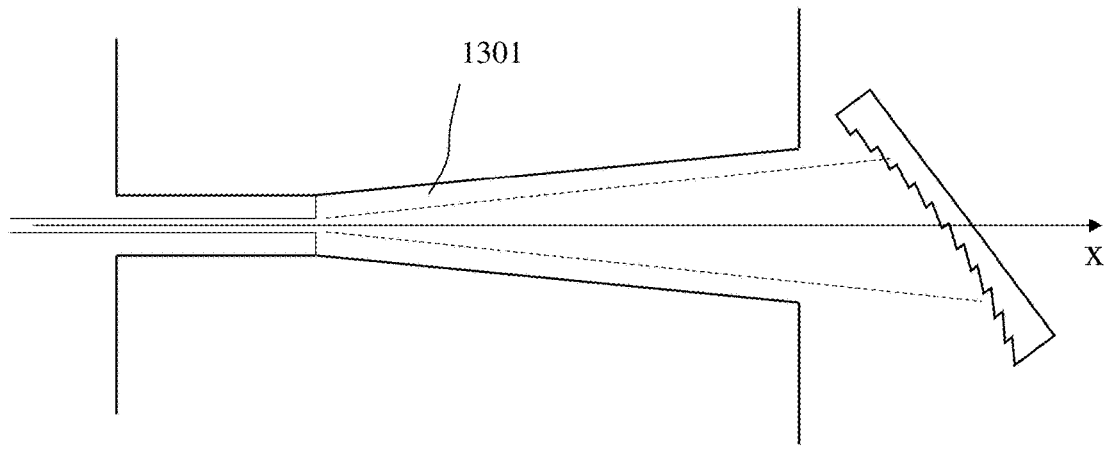
FIG. 13 depicts a reflecting diffraction element in conjunction with a MEMS actuated suspended waveguide beam according to an embodiment of the invention and extended flexible region.

In another embodiment of the invention, where a diffraction grating is used in association with the deformable region, at least a part of the region 1301 where the optical beam expands has a trapezoidal shape, as depicted in FIG. 13. This can provide the advantage of being more flexible mechanically, e.g. compared to a rectangular shape, while allowing the optical beam to freely propagate.

Figure 14:
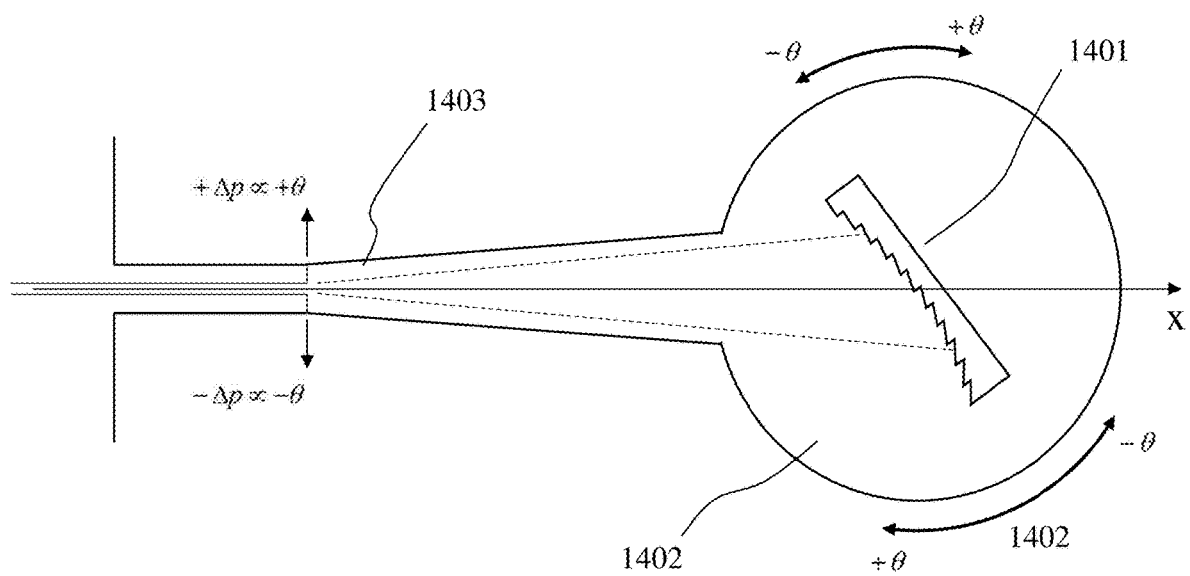
FIG. 14 depicts a diffraction grating upon a rotatable MEMS element in conjunction with a MEMS actuated suspected waveguide beam according to an embodiment of the invention.

In another embodiment of the invention, where a diffraction grating is used in association with the deformable region, the diffraction grating 1401 is placed on a rotating platform 1402 actuated by MEMS, whose center of rotation may in particular be the pole of the diffraction grating. The connection between the waveguide and the rotating platform is made with at least one deformable region 1403, for example a mechanical beam, as depicted in FIG. 14. Accordingly, the deformable region 1403 deflects under rotation of the rotating platform 1402 adjusting the optical beam's incident angle with respect to the CDG 1401. In contrast to a prior art rotatable MEMS grating device, such as Menard et al. in World Patent WO/2015/131271 entitled "Mirror Based Microelectromechanical Systems and Methods," the design depicted in FIG. 14 is absent waveguide-air interfaces with their requirements for anti-reflection coatings, tight tolerances on manufacturing etc.

Figure 15:
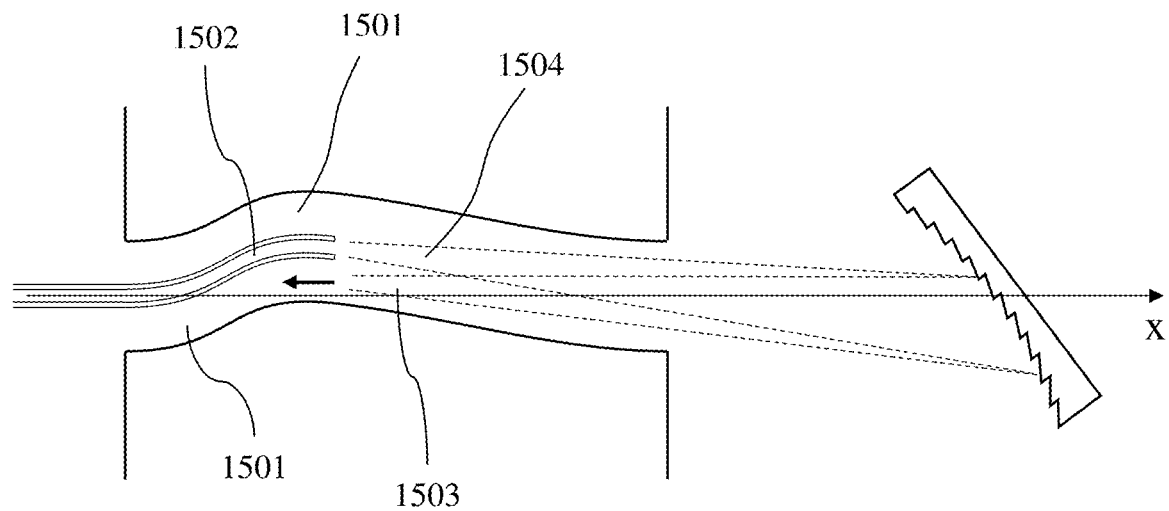
FIG. 15 depicts a reflecting diffraction element in conjunction with a MEMS actuated suspended waveguide beam according to an embodiment of the invention and extended flexible region wherein the reflected signal does not interact with the MEMS actuated waveguide but may be coupled back to the stationary input waveguide section.

In another embodiment of the invention, where a diffraction grating is used in association with the deformable region, a space region 1501 is provided around the input optical beam 1502 to allow for retro-diffracted beams 1503 of a given wavelength region to propagate besides the retro-diffracted beam 1504 of interest (selected wavelength), with minimal interaction with the optical device, such as boundaries, facets etc. as depicted in FIG. 15. This can provide the advantage of collecting the desired wavelength back in the input waveguide, with other wavelengths interfering minimally with it, for example by avoiding lateral reflections of optical beams of other wavelengths that could contribute to crosstalk.

Figure 16:
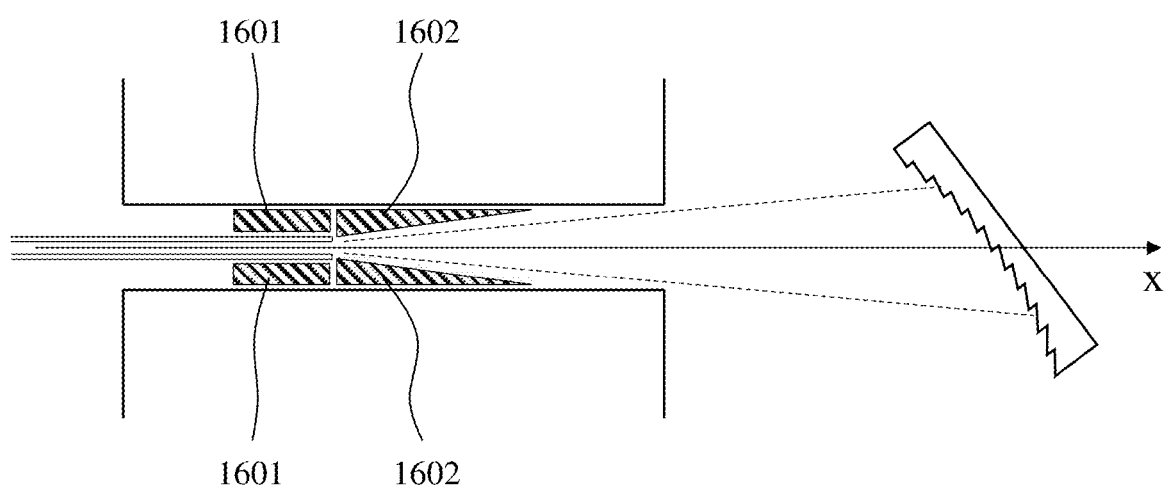
FIG. 16 depicts the addition of dedicated "absorber" sections to avoid unwanted reflections within a reflective diffraction grating based device employing a MEMS actuated suspended waveguide.

In another embodiment of the invention, where a diffraction grating is used in association with the deformable region, first and second spoiler elements 1601 and 1602 respectively are added in the channel waveguide and slab waveguide regions respectively to avoid unwanted reflections of the optical beams of specific wavelength ranges (e.g. desired or undesired wavelengths) or to act as a beam dump such as depicted in FIG. 16. These spoiler elements may be placed on one side or both sides of the optical region according to constraints including, for example, photonic integrated circuit design, MEMS element design and beam geometry. They may also be placed besides the input or output waveguide. The spoiler elements may be light absorbers. They may also be Bragg gratings or photonic crystals, which can couple the in-plane light into out-of-plane light, or the light inside the planar waveguide out of it laterally.

Figure 22:
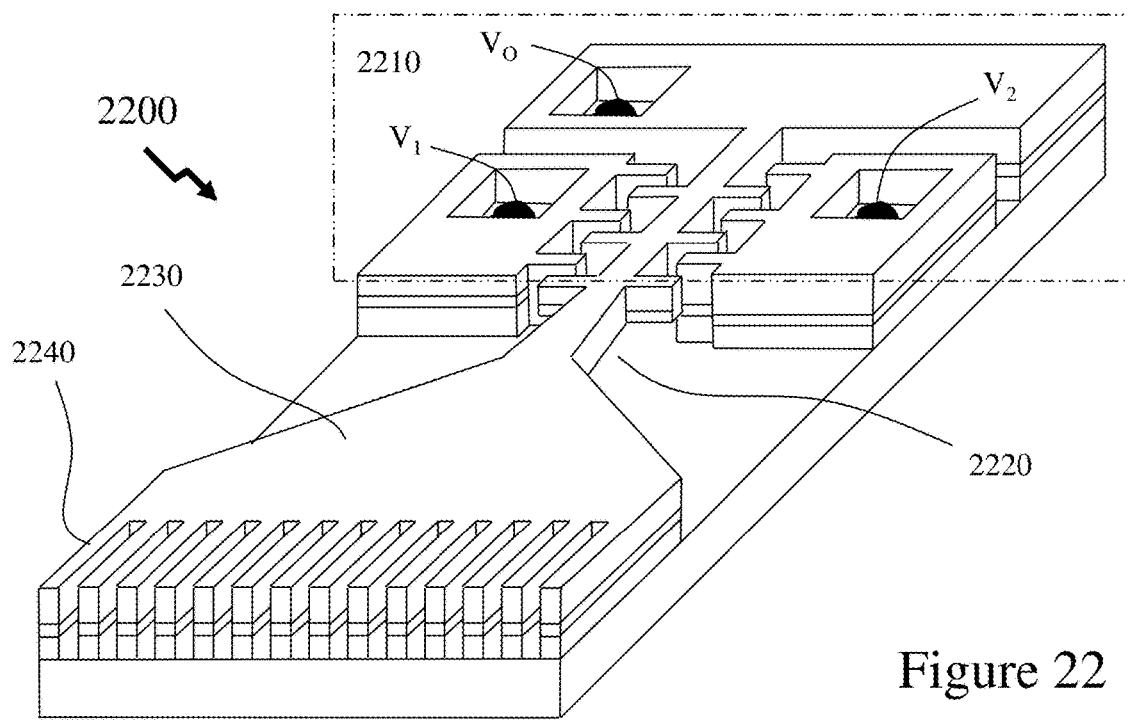
FIG. 22 depicts a perspective three-dimensional view of a MEMS based variable launch as part of a photonic integrated circuit for tunable transmissive filtering of optical signals through an array waveguide grating (AWG) according to an embodiment of the invention.

In another embodiment of the invention, an arrayed waveguide gratings (AWG) is used in association with the deformable region, see FIG. 22 for example. All the embodiments applying to a diffraction grating may also be applied to an AWG for the same benefits, such as wavelength control.

Figure 17:
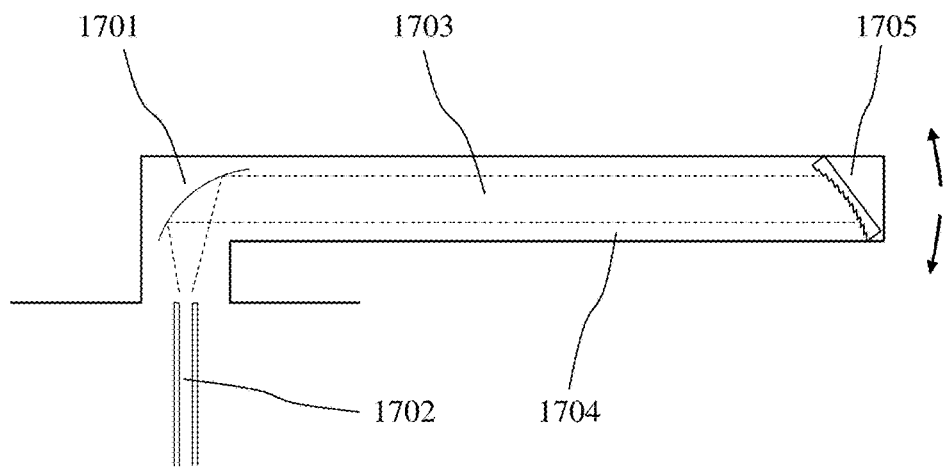
FIG. 17 depicts an embodiment of the invention exploiting a substantially parabolic mirror for beam collimation in conjunction with a grating upon an extended mechanical beam.

In another embodiment of the invention, a substantially parabolic mirror 1701 is used to transform an optical beam originating from a waveguide 1702 into a collimated beam 1703. The collimated beam propagates in a deformable region 1704, such as a mechanical beam and gets diffracted by a substantially flat diffraction grating 1705, as depicted in FIG. 17. The deformation of the beam allows to change the angle of incidence of the light on the diffraction grating, modifying the diffracted beam. This allows for example to create a wavelength tunable reflector.

In all the embodiments of the invention, the at least one deformable region may be deformed using micro-electromechanical systems (MEMS) such as those exploiting electrostatic attraction/repulsion.

In all the embodiments of the invention, the at least one deformable region may be deformed using mechanical, electrical, magnetic, or piezo actuators, or with thermal deformation or with shape memory alloys.

In all the embodiments of the invention, the materials used of the at least one deformable region may be one of or an association or mixing of semiconductors, dielectrics, metals, etc. In particular these materials may include, but not be limited to, silicon dioxide ($SiO_2$), silicon nitride ($Si_3N_4$), silicon oxynitride ($SiO_xN_{1-x}$), silicon, indium phosphide (InP) related materials, gallium arsenide (GaAs) related materials, polymers, or silicones, e.g. polydimethylsiloxane (PDMS).

C: MICROELECTROMECHANICALLY ACTUATED ROTATING GRATING BASED WAVELENGTH TUNABLE FILTERS AND TUNABLE SOURCES

Figure 18:
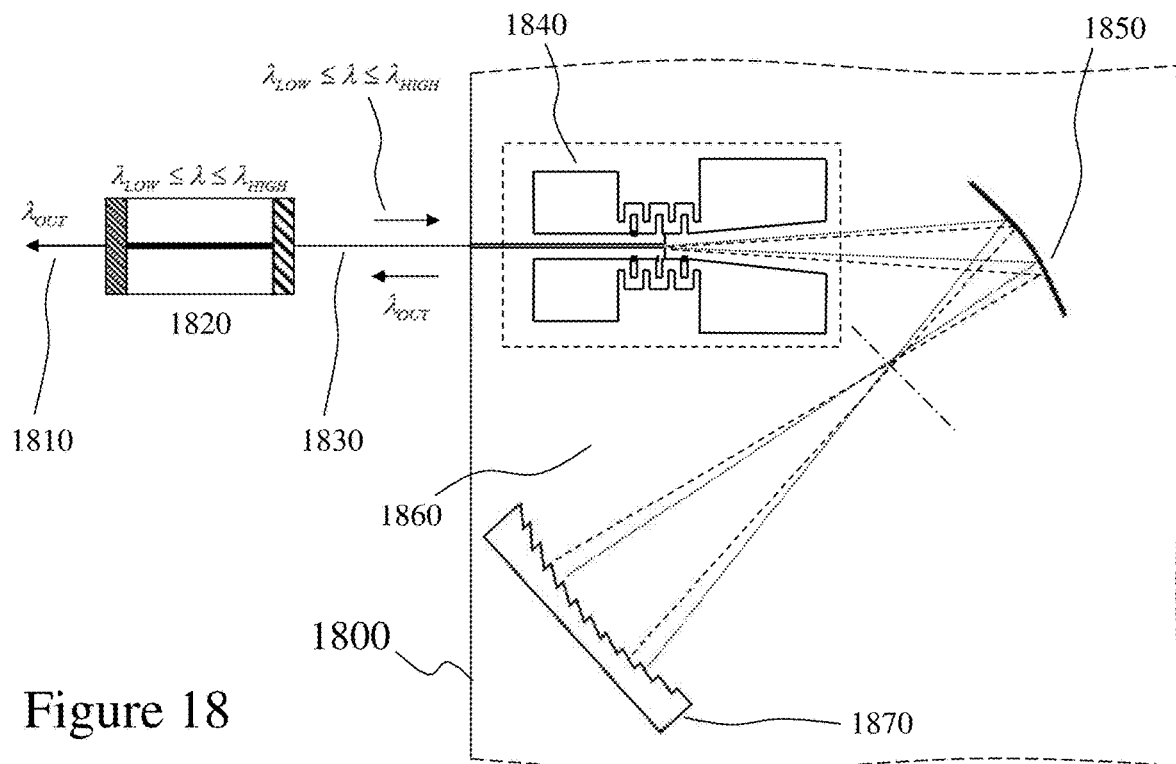
FIG. 18 depicts a Tunable Optical Source (TOS) exploiting a reflective Concave Diffraction Grating (CDG), channel waveguides and planar waveguides according to an embodiment of the invention.

Referring to FIG. 18 there is depicted a tunable optical source (TOS) exploiting a suspended waveguide variable launch MEMS according to embodiments of the invention in conjunction with an integrated CDG and planar waveguides according to an embodiment of the invention. As depicted a PIC 1800 is coupled to a SOE 1820 via an optical fiber 1830. The PIC 1800 comprises a channel (3D) waveguide coupled to a suspended waveguide variable launch MEMS 1840 according to an embodiment of the invention which couples to a planar waveguide 1860 within which are formed a mirror 1850 and a CDG 1870. Accordingly, within the PIC 1800 the optical signals propagate and expand in the planar waveguide of the suspended waveguide variable launch MEMS 1840 which is then propagated within the planar waveguide 1860, reflected from the mirror 1850 and coupled to the CDG 1870 wherein the optical signals are retro-reflected by the CDG 1870 which is used in the Littrow configuration with adapted focalization, and then follows the reverse path with associated beam focusing and defocusing to the mirror 1850, channel waveguide within the suspended waveguide variable launch MEMS 1840 and therein to the SOE 1820. Accordingly, the mode of operation is that light is generated in the gain medium of the SOE 1820 and is filtered wherein the wavelength is defined by the CDG 1870, the mirror 1850, and the optical launch position/launch angle of the channel waveguide within the suspended waveguide variable launch MEMS 1840. Accordingly, continuous tuning is possible with motion of the suspended waveguide. Alternatively, the suspended waveguide may be positioned at one of a predetermined locations defining a specific wavelength within a specified wavelength grid, e.g. ITU C-band 100 GHz grid.

Figure 19:
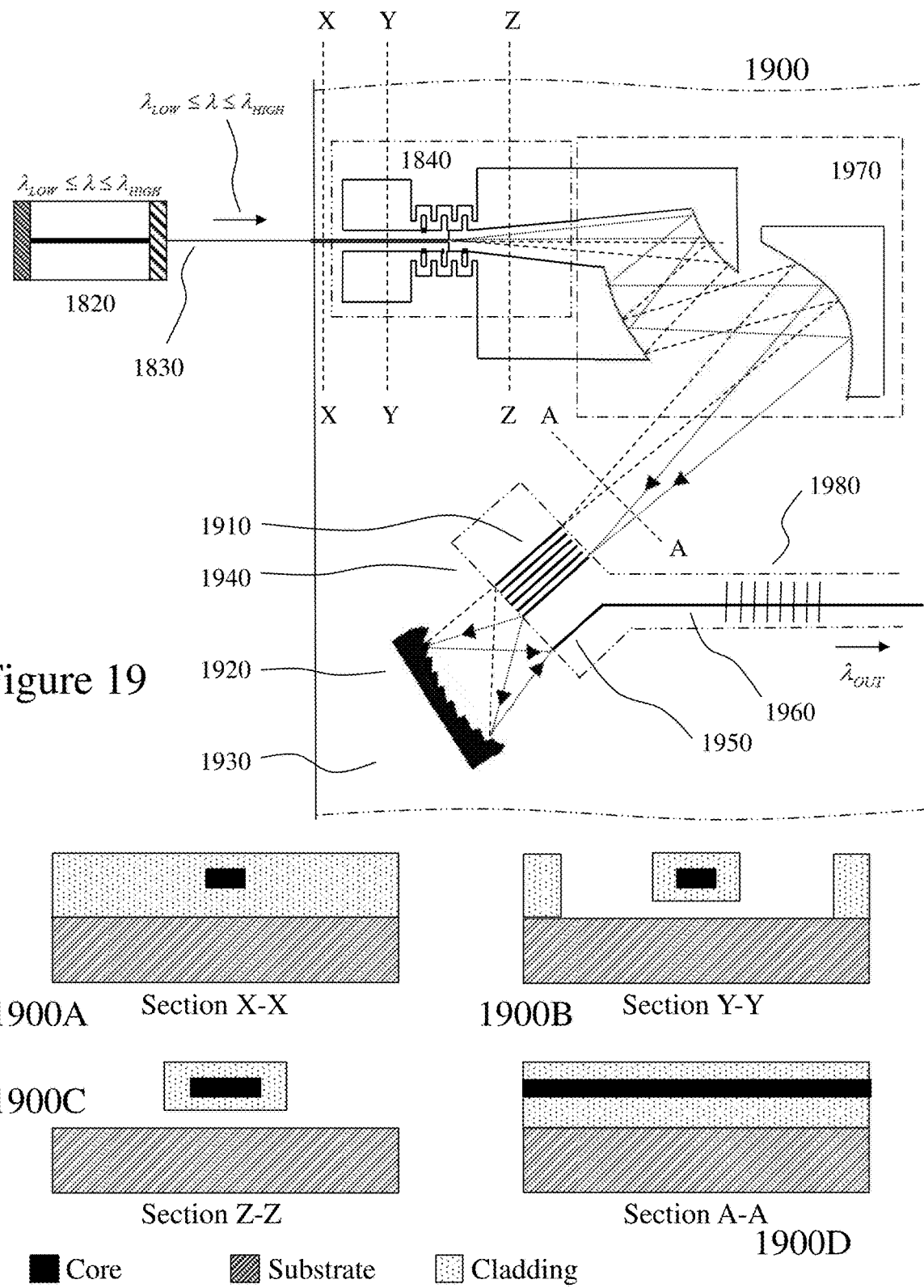
FIG. 19 depicts a TOS exploiting a reflective CDG, channel waveguides, broadband Bragg reflector and planar waveguides according to an embodiment of the invention.

Now referring to FIG. 19 there is depicted a tunable optical source (TOS) exploiting a suspended waveguide variable launch MEMS according to embodiments of the invention in conjunction with an integrated CDG and planar waveguides according to an embodiment of the invention. As depicted a PIC 1900 is coupled to a SOE 1820 via an optical fiber 1830. The PIC 1900 comprises a channel (3D) waveguide coupled to a suspended waveguide variable launch MEMS 1840 according to an embodiment of the invention which couples to a planar waveguide 1930 within which are formed a mirror array 1970 and a CDG 1920. Also disposed within the PIC 1900 is a region of channel waveguides 1910. Accordingly, within the PIC 1900 the optical signals propagate and expand in the planar waveguide of the suspended waveguide variable launch MEMS 1840, are coupled to the planar waveguide within the PIC 1900, are reflected by the mirror array 1970 and focused onto a focal line. However, now unlike FIG. 18 and simply re-expanding with the planar waveguide 1930 the optical signal couples to one of a plurality of filter waveguides 1910 within waveguide array 1940, each being a short waveguide region, and then re-launches into the planar waveguide 1930 and is reflected by the CDG 1920.

However, now rather than retro-reflecting in a Littrow configuration as depicted in FIG. 18 the reflected optical signal is coupled to an output at the end of the PIC 1900 via first and second output waveguide sections 1950 and 1960 respectively. Accordingly, the mode of operation is that light is generated in the gain medium of the SOE 1820 and is filtered wherein the wavelength is defined by the CDG 1920 and the launch signal coupled to it from the selected filter waveguide of the plurality of filter waveguides 1910 which is in turn dependent upon the location and angle of the suspended waveguide variable launch MEMS. Angular and/or location variations of the suspended waveguide variable launch MEMS are multiplied through the mirror array 1970 to achieve the desired spatial range over the plurality of filter waveguides 1910 from the tuning range of the suspended waveguide variable launch MEMS. Accordingly, PIC 1900 provides discrete wavelength tuning defined by the CDG 1920, the plurality of filter waveguides 1910, and the suspended waveguide variable launch MEMS 1840. The optical cavity is defined by the high reflective facet of the SOE 1820 and the broadband Bragg grating 1980 wherein the CDG 1920, the plurality of filter waveguides 1910, and the suspended waveguide variable launch MEMS 1840 act as a tunable wavelength filter within the optical cavity such that lasing action can be established.

Also depicted in FIG. 19 are first to fourth cross-sections 1900A to 1900D respectively depicting:

First cross-section 1900A depicting cross-section X-X through a region comprising embedded waveguide with a core disposed within upper and lower cladding;

Second cross-section 1900B depicting cross-section Y-Y through the region of the suspended waveguide;

Third cross-section 1900C depicting cross-section Z-Z through the region of the suspended region as it begins tapering towards a slab waveguide;

Fourth cross-section 1900D depicting cross-section A-A through a slab waveguide region.

Figure 20:
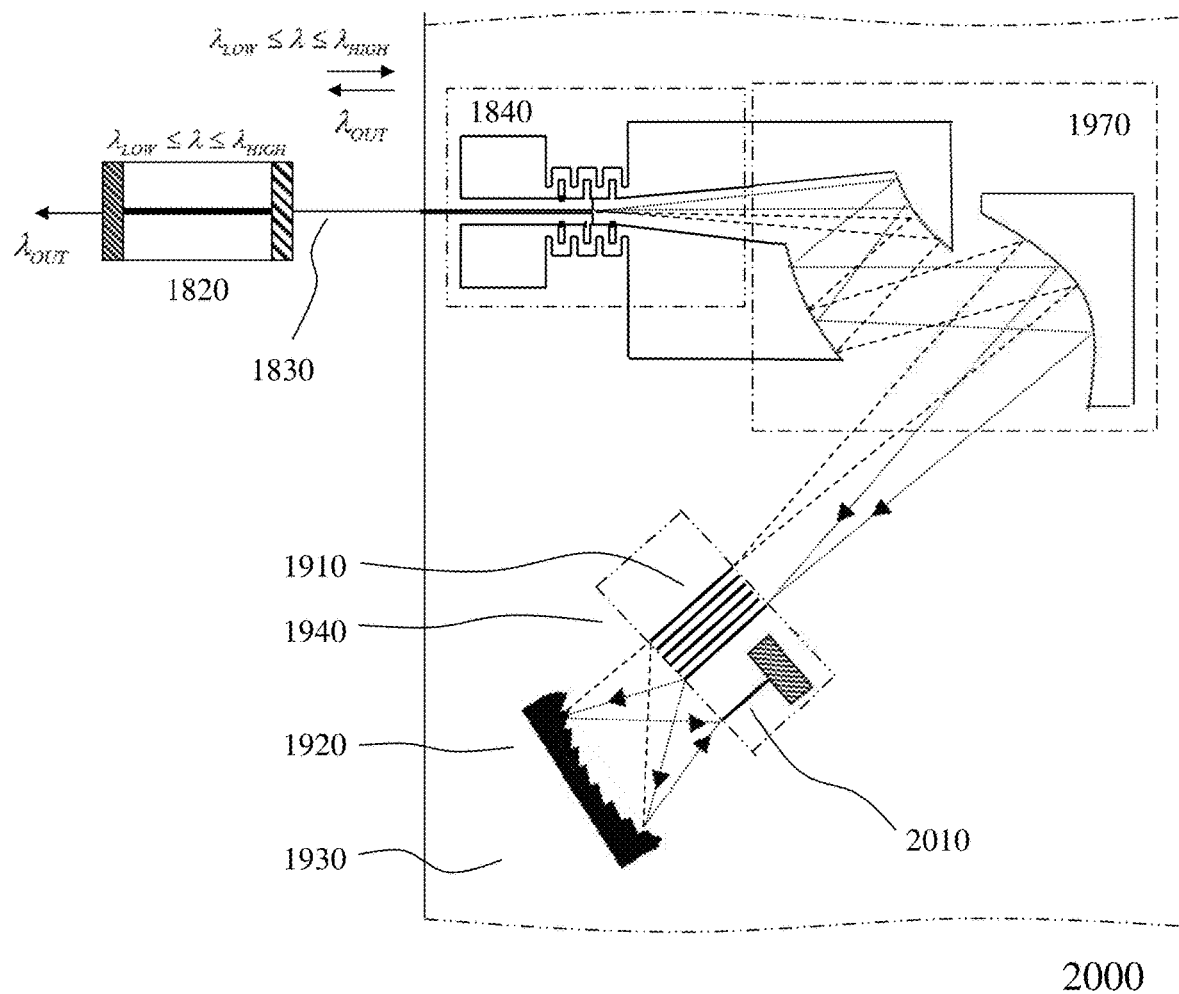
FIG. 20 depicts a TOS exploiting an integrated CDG, channel waveguides, mirror and planar waveguides according to an embodiment of the invention.

Referring to FIG. 20 there is depicted a TOS exploiting a suspended waveguide variable launch MEMS in common with FIGS. 18 and 19. In common with PIC 1900 in FIG. 19 the PIC 2000 comprises the suspended waveguide variable launch MEMS 1840, the mirror array 1970, CDG 1920 and planar waveguide 1930. However, now whilst there is also the plurality of channel waveguides 1910 the PIC 2000 is reflective in that mirrored waveguide 2010 replaces the first and second output waveguide sections 1950 and 1960 respectively together with the broadband Bragg grating 1980. Accordingly, after the initial pass through the suspended waveguide variable launch MEMS 1840, the mirror array 1970, channel waveguide 1910, and CDG 1920 via planar waveguide 1930 the signal is coupled from the CDG 1920 to the mirrored waveguide 2010 which has a mirror disposed at the other end from that coupling the signals. Accordingly, the signal is reflected and passes back through the optical train to the SOE 1820. Accordingly, the high reflectivity facet of the SOE 1820 and mirrored waveguide 2010 form the laser cavity within which is the tunable wavelength filter formed from the suspended waveguide variable launch MEMS 1840, the mirror array 1970, channel waveguide 1910, and CDG 1920.

Optionally, the embodiments of the invention depicted in respect of FIGS. 19 and 20 may be combined in that a broadband 100% Bragg grating may be employed in the mirror waveguide 2010 rather than an etched/metallized facet for example allowing filtering of out of band signals.

Figure 21:
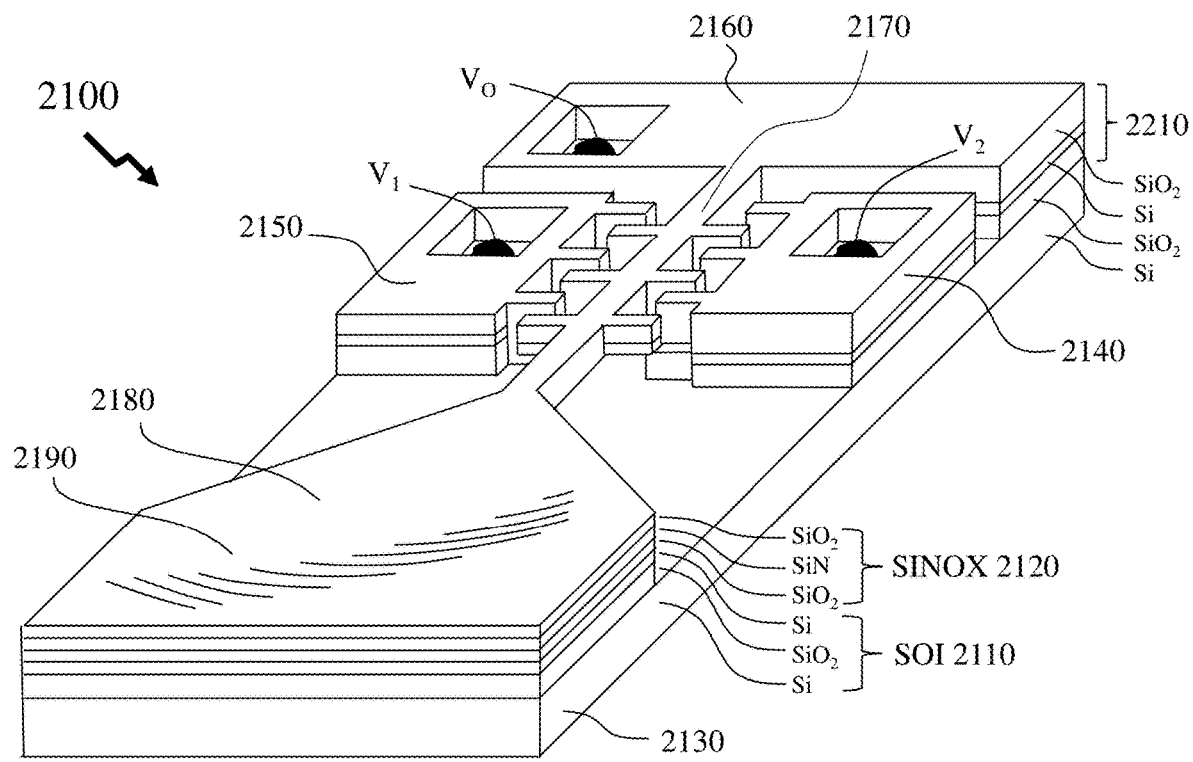
FIG. 21 depicts a perspective three-dimensional view of a MEMS based variable launch as part of a photonic integrated circuit for tunable reflective filtering of optical signals through a planar waveguide and its associated CDG.

Referring to FIG. 21 a PIC 2100 is depicted in three-dimensional perspective view. Accordingly, there is depicted the suspended channel waveguide 2170 which transitions to the planar waveguide 2180 and input waveguide section 2160. Within the embodiment of the invention depicted the channel waveguide 2170 is based upon a silicon-on-insulator (SOI) 2110 structure comprising a silicon (Si) substrate, silicon dioxide ($SiO_2$), silicon (Si), and $SiO_2$. The channel waveguide 2170 is disposed between first and second MEMS structures 2140 and 2150 respectively which can be biased at $V_1$ and $V_2$ respectively relative to the bias of the channel waveguide 2170 which is set at $V_0$. The channel waveguide 2170 and first and second MEMS structures 2140 and 2150 respectively having interleaving fingers allowing the channel waveguide 2170 to be laterally moved by the MEMS actuator under electrostatic attraction/repulsion as known in the prior art.

As depicted the channel waveguide 2170 couples to a planar waveguide 2180 which is formed from an underlying SOI 2110 planar waveguide region with a silicon nitride—silicon oxide (SINOX) overlay 2120 comprising a $SiO_2$—SiN—$SiO_2$ stack. The CDG 2190 being defined within the SiN layer which can be further etched into the underlying $SiO_2$—Si—$SiO_2$—Si stack and then capped with the topmost $SiO_2$ layer in an embodiment of the invention or the SiN layer is etched and the underlying $SiO_2$—Si—$SiO_2$—Si stack unetched within another embodiment. Whilst a symmetric drive MEMS is depicted with electrostatic actuators disposed on either side it would be evident that optionally an asymmetric drive design may be employed with a single electrostatic actuator on one side of the channel waveguide.

Now referring to FIG. 22 there is depicted a PIC 2200 wherein the suspended waveguide MEMS 2210 as described in respect of FIG. 21 comprising channel waveguide 2170, first and second MEMS structures 2140 and 2150 and input waveguide section 2160 now couples to a planar waveguide region 2230 which forms the input planar splitter of an array waveguide grating (AWG) which then transitions to the array of channel waveguides 2240.

Within the embodiments of the invention described and depicted supra in respect of FIGS. 2 to 22 the MEMS has been primarily described as being an electrostatically actuated MEMS device and has been depicted primarily schematically as having a "basic" comb design with single interdigitated electrode pairs along either side of the suspended waveguide and associated anchored actuators. This yields a certain range of movement according to the design of the electrostatic comb sections. However, it would be evident that other designs of actuator may be employed including dual sided electrostatic comb drives, single sided electrostatic comb-drive, electrostatic comb-drive with spring, electrostatic comb-drive with tilted spring, electrostatic comb-drive with pre-bent suspended spring, electrostatic comb-drive with cascaded comb-drives, and distributed electrostatic actuators (series and/or parallel cascade). Optionally, rather than electrostatic actuation the actuators may exploit magnetic actuation, thermal actuation, etc.

Within the embodiments of the invention described and depicted supra in respect of FIGS. 2 to 22 electrostatic actuation must be maintained if the MOEMS is to maintain a specific wavelength. However, it would be evident to one of skill in the art that the central suspended channel waveguide within the MOEMS may be designed to include one or more latching mechanisms to latch the MOEMS into predetermined positions corresponding to design wavelengths of the tunable filter, tunable detector, tunable emitter etc. that the MOEMS element forms part of the wavelength tunable functionality. For example, a latch may be disposed to one side of the channel waveguide for all positions, two mechanisms may be disposed on either side each covering part of the overall channel plan (e.g. one for odd channels, one for even channels) or that multiple latches may be employed disposed on one or both sides.

Figure 23:
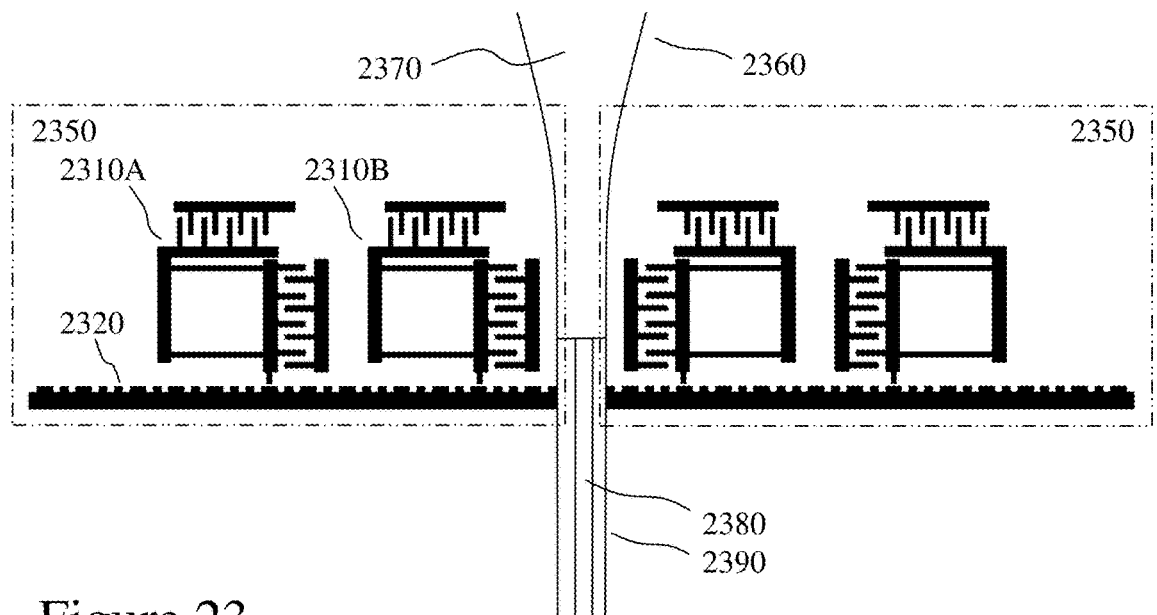
FIG. 23 depicts an electrostatically driven MEMS based inchworm drive mechanism for a suspended waveguide according to an embodiment of the invention.

An extension of that is a latching inchworm electrostatic drive such as depicted in FIG. 23 wherein a shuttle 2320 is connected to a pair of electrostatic drives 2310A and 2310B which alternatively engage the shuttle 2320 and move it. Accordingly, by appropriate design the tip of one of the pair of electrostatic drives 2310A and 2310B may be pre-sprung to engage the shuttle 2320 so that under no voltage the shuttle 2320 is retained in position. As indicated inchworm drives 2350 each comprising a shuttle 2320 and pair of electrostatic drives 2310A and 2310B are disposed on either side of the central suspended beam 2390 which has channel waveguide 2380 as it transitions to tapering beam 2360 with the planar waveguide 2370. Alternatively, the channel waveguide 2380 may terminate prior to the actuator(s) or after them.

Figure 24:
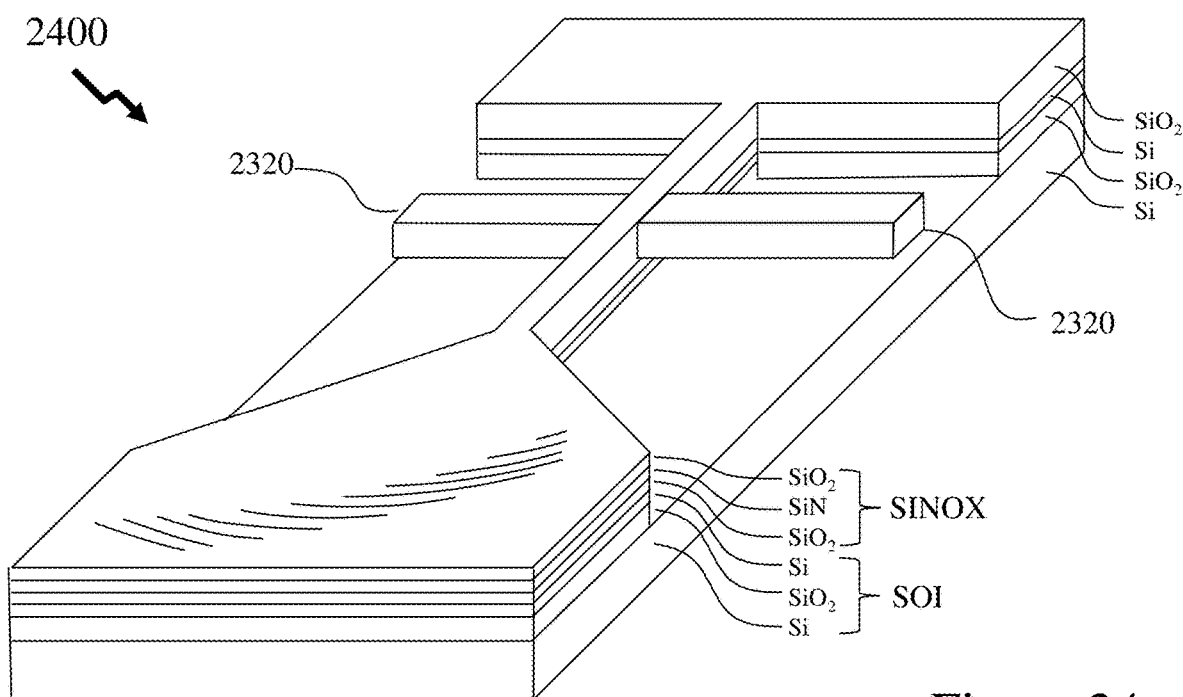
FIG. 24 depicts an electrostatically driven MEMS based suspended waveguide according to an embodiment of the invention depicted in FIG. 23.

Referring to FIG. 24 there is depicted a 3D perspective view 2400 of the configuration of FIG. 23 with the pair of electrostatic drives 2310A and 2310B not shown but the shuttles 2320 depicted simplistically. It would be evident to one of skill in the art that the designs described and depicted in respect of FIGS. 2 to 24 have been single layer structures in that the MEMS and optical waveguide are formed within a single layer structure or a single common layer structure for the optical waveguide portion of the MOEMS/MEMS with the mechanical portion of the MOEMS/MEMS. However, it would be evident that within other embodiments of the invention that the optical waveguide may be formed upon a MEMS element, such as for example a silicon-on-insulator waveguide formed upon a silicon MEMS or a silicon carbide MEMS. Accordingly, dielectric waveguides may be formed upon ceramic MEMS elements.

Figure 25:
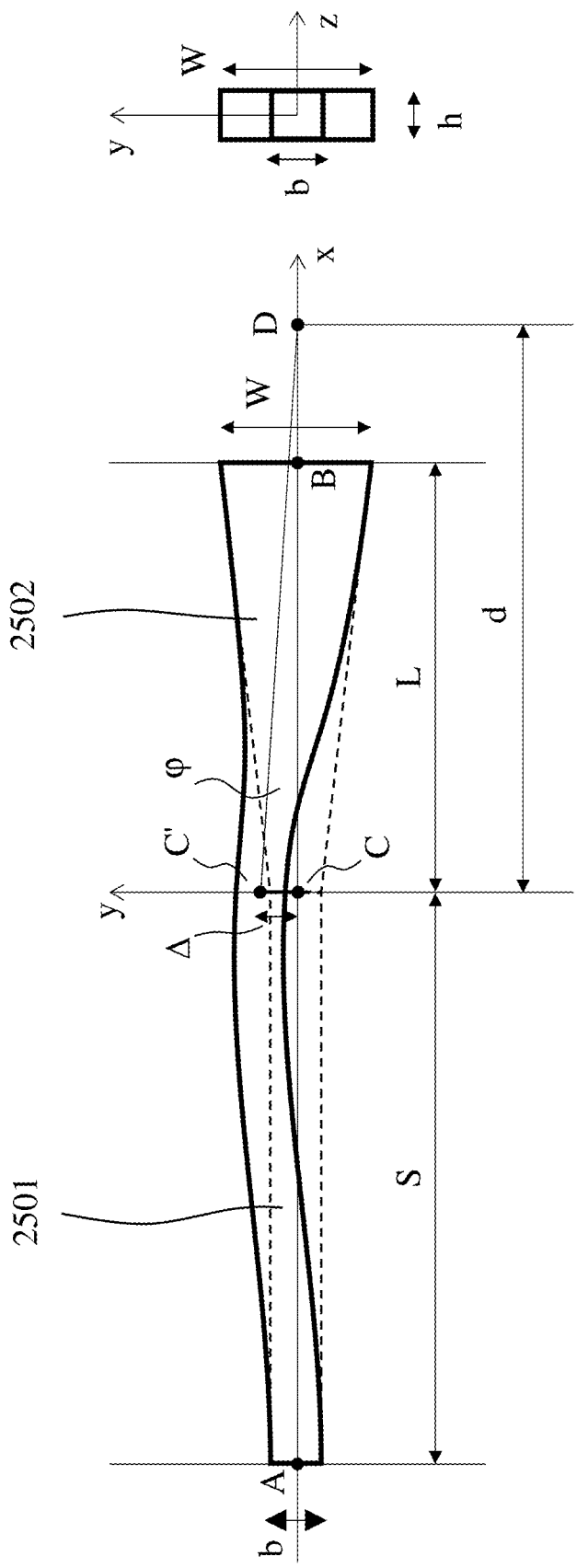
FIG. 25 depicts a MEMS actuated suspended waveguide beam according to an embodiment of the invention comprising rectangular and trapezoidal first and second sections according to an embodiment of the invention.

Within another embodiment of the invention, as depicted in FIG. 25, a deformable mechanical beam is formed from a beam of height h of a material having a Young's modulus E and comprising first and second sections 2501 and 2502 respectively of lengths S and L. First section 2501 being rectangular in cross-section and of width b whilst second section 2502 is trapezoidal having a width b at the connection with first section 2501 and a width W at the other end (W≠b). In first section 2501 (x<0) the second moment of area 1 is given by Equation (19), and in second section 2502 (x>0) by Equation (20).

$$I = \frac{hb^3}{12} \quad (19)$$

$$I = \frac{h}{12}\left(\frac{W-b}{L}x+b\right)^3 \quad (20)$$

A force of magnitude F is applied at the connection point C between the first and second sections 2501 and 2502 respectively. It can be shown that for small displacements the deflection Δ of the beam at connection point C is given by Equations (21A) to (21D) below.

$$\Delta = \frac{6F}{Eh} \cdot \frac{\Im(1)}{\Im(2)+\Im(3)} \quad (21A)$$

$$\Im(1) = L^3S^3\Big(SW(4b-3W)+8Lb(b-W)- \quad (21B)$$
$$Sb^2 + 2\log\left(\frac{W}{b}\right)[2Lb(W+b)+SW^2)]\Big)$$

$$\Im(2) = \{[2LS^3b(W+b)+S^4W^2+6L^2S^2b^2](W-b)^2 - \quad (21C)$$
$$6L^3Sb^3(3W-b)-12L^4b^4\}(w-b)$$

$$\Im(3) = 6\log\left(\frac{W}{b}\right)[L^4b^4(W+b)+2L^3SW^2b^3] \quad (21D)$$

It is possible to keep the orientation of the optical beam axis towards a given point D at a distance d from point C, i.e. D will be on the optical beam axis. This implies the condition of Equation (9) for the angle Ω of the beam at C, and it can be shown that the length of first section 2501 is therefore determined from L, d, W, and b by Equations (22A) to (22E) below, with S>0. In particular, the pole of the diffraction grating can be advantageously placed at this point D, for example to reduce aberrations or to collect more light.

$$S = \frac{2L^2b^2\left[2(b-W)+\log\left(\frac{W}{b}\right)(W+b)\right] \pm \sqrt{2}\,Lb\cdot\sqrt{\Im(4)\cdot\{\Im(5)+\Im(6)\}}}{\Im(7)} \quad (22A)$$

$$\Im(4) = \left[2(b-W)+\log\left(\frac{W}{b}\right)(W+b)\right] \quad (22B)$$

$$\Im(5) = [3d^2W(2b-W)+3Ldb(b-3W)+(4L^2-3d^2)b^2](b-W) \quad (22C)$$

$$\Im(6) = 2Lb\log\left(\frac{W}{b}\right)[Lb(W+b)-3dW^2] \quad (22D)$$

$$\Im(7) = (W-b)[Lb(3W-b)+d(W-b)^2]-2LW^2b\log\left(\frac{W}{b}\right) \quad (22E)$$

Figure 26:
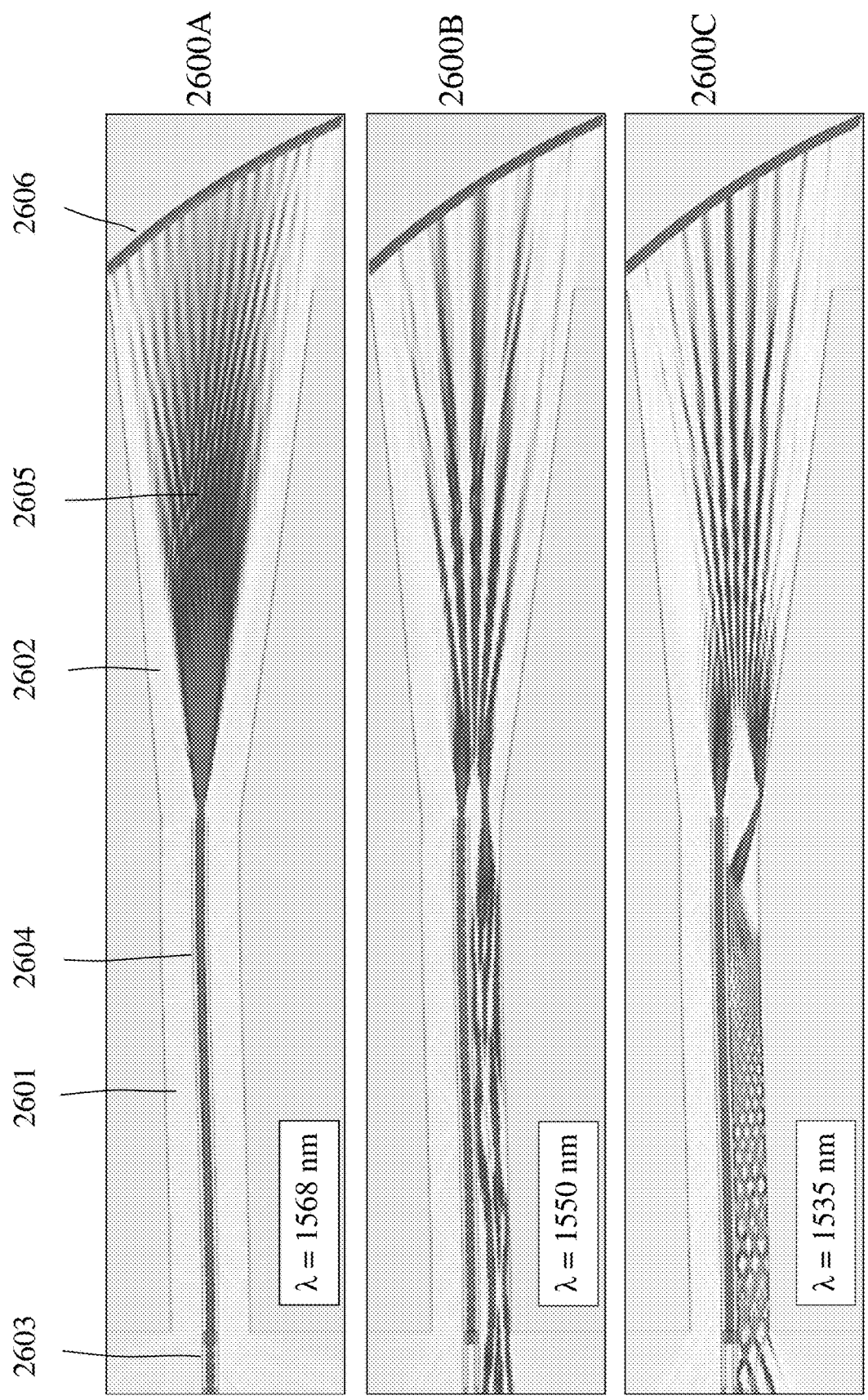
FIG. 26 depicts optical field distributions according to the MEMS actuated suspended waveguide beam design of FIGS. 13 and 25 with laterally guided and laterally unguided first and second sections according to an embodiment of the invention.

Referring to FIG. 26 there are depicted first to third optical field distributions (OFDs) 2600A to 2600C for a cantilever beam structure according to an embodiment of the invention such as depicted in FIGS. 13 and 25 respectively. The first to third OFDs 2600A to 2600C being obtained by finite-difference time-domain (FDTD) simulation at 1568 nm, 1550 nm, and 1535 nm respectively. Accordingly, the light beam propagates in a channel waveguide 2603 and enters a rectangular deformable mechanical beam comprising a laterally guided section 2601 where the channel waveguide 2604 continues. The light beam then enters a trapezoidal deformable mechanical beam laterally unguided section 2602, where it expands as unguided beam 2605. It is then retro-diffracted by a concave diffraction grating 2606 and propagates back into sections 2602 and 2601 respectively.

The optical waveguide employed within the first to third OFDs 2600A to 2600C is a silicon-on-insulator (SOI) design employing a 220 nm thick silicon planar waveguide and silica cladding. The dimensions employed within the simulations were W=104 μm, b=40 μm, d=500 μm, L=426 μm, and S=415 μm wherein the diffraction grating has a period a=757 nm and the simulated displacements were Δ=5 μm. First OFD 2600A depicts the result for λ=1568 nm, wherein the optical signal couples back to the channel waveguides 2604 and 2603 for this displacement Δ=5 μm. Second and third OFDs 2600B and 2600C for wavelengths λ=1550 nm and λ=1535 nm respectively show that the optical signals are focused back at a different location and do not recouple to the channel waveguide 2604. Instead, they are mostly confined on the sides of the section 2601. This is where spoiler elements, such as spoiler elements 1601 in FIG. 16, for example may be positioned.

Figure 27:
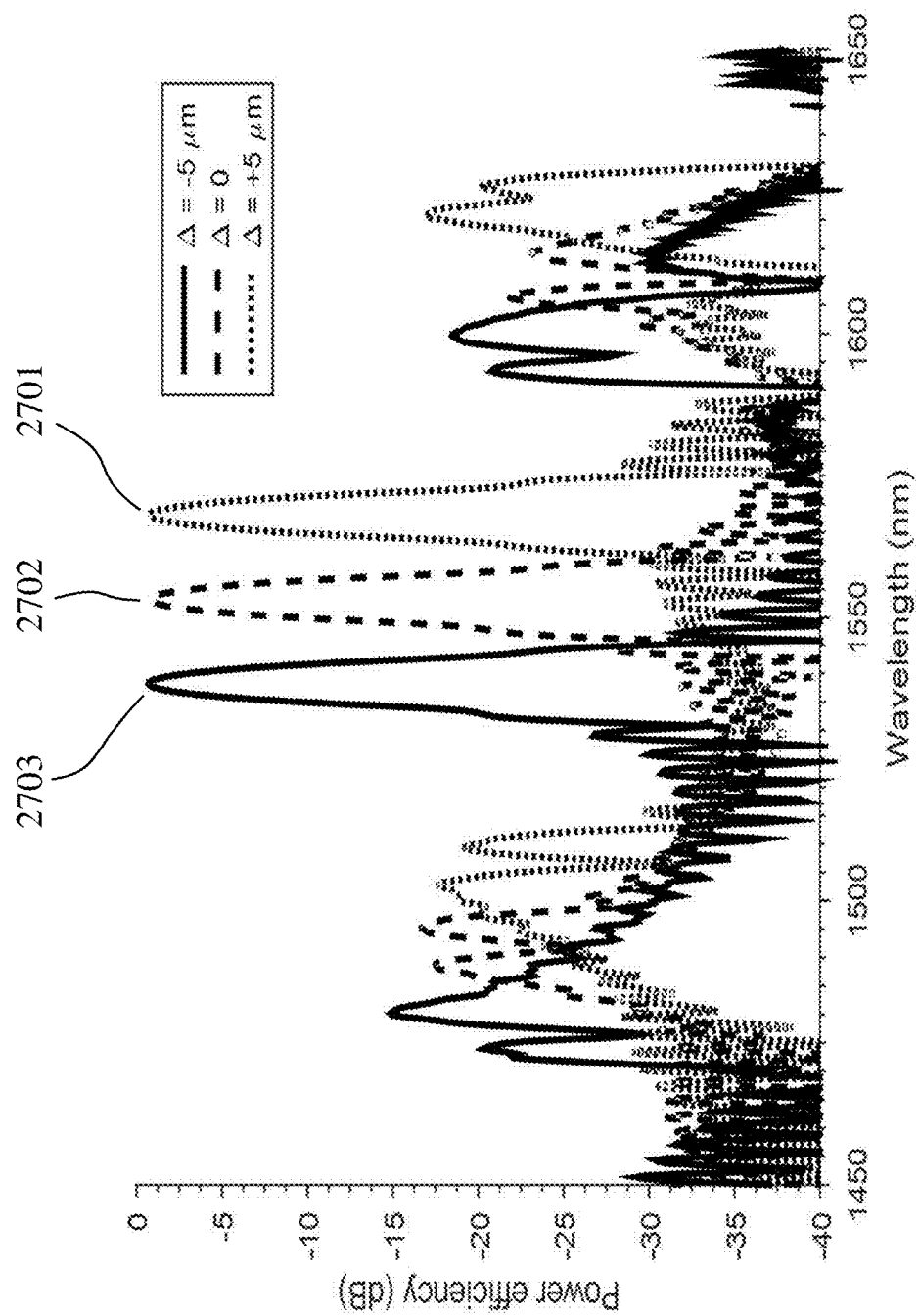
FIG. 27 depicts a spectral plot of optical power reflected back to a channel waveguide according to the MEMS actuated suspended waveguide beam design of FIGS. 13 and 25 with laterally guided and laterally unguided first and second sections according to an embodiment of the invention.

Accordingly, the wavelength selectivity of the wavelength coupled back to the channel waveguide is also visible on the spectral plot of optical power efficiency of FIG. 27 for Δ=+5 μm, as peak 2701. In addition, FIG. 27 depicts the spectra for several displacements Δ=+5 μm; 0 μm; −5 μm respectively, and demonstrates the tunability of the wavelength reflected with first to third peaks 2701 to 2703 respectively, in this case over a 30 nm range.

Hence, designs may exploit, for example, a common SOI based waveguide—MEMS structure comprising Si—SiO$_2$—Si—SiO$_2$ wherein the lower Si is the substrate, the lower SiO$_2$ the sacrificial layer for releasing the MEMS, the second Si forms the lower mechanical layer of the MEMS and the upper cladding SiO$_2$ the cladding for the channel waveguide/planar waveguide. Alternatively, a silicon oxynitride waveguide/polymer waveguide/SOI waveguide may be formed upon other MEMS mechanical layers that may include, but are not limited to, silicon carbide (SiC), silicon nitride (Si$_3$N$_4$), silicon dioxide (SiO$_2$), aluminum nitride (AlN), alumina (Al$_2$O$_3$), zirconia (ZrO$_2$), and diamond (C).

It would be evident to one of skill in the art that within the descriptions supra in respect of FIGS. 2 to 22 and the associated drawing that many features have been omitted for clarity and simplicity of the descriptions and figures. Such elements may include, but not be limited to, springs, torsion elements, attachments, etc. together with linear and/or rotary actuators such as those exploiting thermal effects, e.g. deformation by heating, or electrostatic effects, e.g. comb actuators.

Within the embodiments of the invention described supra in respect of FIGS. 2 to 24 the channel waveguides have been depicted as straight waveguides however it would be evident that these may be curved waveguides as well as combined straight-curved waveguide geometries as the MEMS and CDG are essentially decoupled in physical positions via the plurality of channel waveguides. Accordingly, the position of the CDG may be established relative to the substrate, the MEMS and any other photonic circuit/electronic circuit/MEMS elements as chosen by the designer. For example, the design constraint may be manufacturing process derived such that a particular orientation enhances CDG facet fabrication, for example, of that folding the CDG adjacent the MEMS allows enhanced CMOS integration, for example.

The Figures themselves are simplified schematics intend to provide a visual representation of embodiments of the invention but are not intended to be accurate in respect of dimensions, angles, distances, relative positions, geometries etc. Further, for devices exploiting Rowland configurations, the schematics may not necessarily appear to be on the Rowland circle or with the precise orientation.

The curved diffraction gratings (CDGs) described herein are based on the Rowland configuration. This configuration can be modified to address other needs such as providing a different focal line. This could, for example, be to simplify the layout by replacing a double platform by a single platform, while providing the same functionality. The CDGs may be replaced by another optical element realizing the same optical functionality, i.e. different wavelengths from one or several inputs into different outputs. The inputs/outputs can be within different embodiments of the invention, channel (rib) waveguides, focal points, or apertures. The separation can be discontinuous (e.g. into channels such as those within CWDM/DWDM systems including International Telecommunications Union standards, or continuous (e.g. spectrum spread in spectrometry). Examples of such devices may include AWG wherein rotation of the AWG leads to coupling of the optical channel input waveguide to a different launch waveguide within the AWG or other MUX/DEMUX optical elements.

Optionally, the CDG may be an elliptical Bragg mirror diffraction grating, a classic diffraction grating with reflective facets (e.g. metallized), or any other type of diffraction grating. The use of an elliptical Bragg mirror diffraction grating can provide more reflection (by diffracting back mainly one order of diffraction).

Within the embodiments of the invention described and depicted in respect of FIGS. 2 to 24 the suspended waveguide MEMS is part of a PIC which may couple via an optical fiber to an SOE, network, or other optical elements. However, within other embodiments of the invention the SOE or other optical elements may be butt-coupled to the PIC or hybrid integrated with butt-waveguide coupling or evanescent wave coupling between the PIC and SOE as known within the prior art. For example, a PIC may exploit silica-on-silicon (SiO$_2$-on-Si) with an indium phosphide (InP) based SOE. Optionally, the SOE may be functionally split between a semiconductor die, e.g. a semiconductor optical amplifier, with a high reflectivity coating formed on facet of the PIC or within a waveguide. Optionally, embodiments of the invention with respect to the PIC may instead of SiO$_2$-on-Si exploit silicon nitride on silicon (Si$_3$N$_4$-on-Si), silicon-on-insulator (SOI), silicon oxynitride on silicon (SiO$_x$N$_y$-on-Si), or polymer on silicon technologies. Optical sources may exploit different semiconductor material systems according to the wavelength of operation. Within such material systems a planar (slab or 2D) waveguide may be implemented via a lower cladding—core—upper cladding or lower cladding—core—air waveguide structure wherein the additional provisioning of a rib upon the upper surface provides for rib-loading of the planar waveguide and accordingly the provisioning of a channel (rib or 3D) waveguide. The CDG may thereby be formed by etching the facets of the CDG into the planar waveguide and metallizing them.

It would be evident that rather than forming wavelength tunable optical sources the PICs may form the basis of other optical components including, but not limited to, wavelength filters, wavelength tunable optical detectors, and wavelength tunable add/drop modules. For example, replacement of the SOE in reflective designs with a circulator and photodetector provides for wavelength tunable optical detectors whilst absent the photodetector it is a wavelength tunable filter.

It would also be evident that within other embodiments of the invention that optical devices may exploit deformable structures with full, partial or no PIC implementation in combination with full, partial or no micro-optic implementation and/or full, partial or no hybrid integration. For example, an optical fiber may be lensed and inserted into a U- or V-shaped mounting forming part of a MEMS actuator wherein a polymeric layer provides the deformable structure between the lensed optical fiber and a diffraction grating. Alternatively, a polymeric region disposed between a fixed optical fiber within a V- or U-groove in the substrate and another optical component may be deformed under action of an actuator such that the deformed beam deflects the optical signal relative to the un-deformed state. Optionally, the sidewall of the deformable region may be metallized for increased reflectivity.

Within the preceding descriptions with respect to FIGS. 2 and 24 an emphasis on tunable wavelength components has been presented. However, it would be evident that the embodiments of the invention can be applied in other applications including, beam steering, optical switching, optical sensors, etc. as a means of opto-mechanically adjusting the direction of an optical beam without requiring the use of a mirror etc. Accordingly, other applications and deployment/device scenarios may be considered other than just wavelength dependent devices.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. An optical device comprising:
    a substrate having formed upon it a layer structure comprising a plurality of layers;
    a deformable structure formed within a first predetermined portion of the layer structure contiguous and continuous between a second predetermined portion of the layer structure at a first predetermined location on the substrate and a third predetermined portion of the layer structure at a second predetermined location on the substrate; and
    an optical component formed within a first subset of the third predetermined portion of the layer structure in a third predetermined location on the substrate; wherein
    each of the first predetermined portion of the layer structure, the second predetermined portion of the layer structure and the third predetermined portion of the layer structure support propagation of optical signals within a predetermined wavelength range;
    deformation of the deformable structure results in the optical signals propagating within the deformable structure coupling to the optical component with at least one of a different orientation and a different position to that when the deformable structure is undeformed;
    the optical component properties are dependent on at least one of the orientation and position of the optical signals coupled to it.

2. The optical device according to claim 1, wherein the optical signals propagating within the deformable structure do not traverse a solid-liquid boundary or solid-gas boundary.

3. The optical device according to claim 1, wherein
    the deformable structure comprises a first optical waveguide formed within a subset of the first predetermined portion of the layer structure which is coupled at a first end to a second waveguide formed within a subset of the second predetermined portion of the layer structure at the first predetermined location on the substrate and at a second distal end to a third waveguide formed within a subset of the third predetermined portion of the layer structure at the second predetermined location on the substrate; and
    optical signals propagating from the second waveguide are coupled to the third waveguide via the first waveguide without traversing a solid-liquid boundary or solid-gas boundary at either the first end of the first waveguide where it couples to the second waveguide and the second distal end of the first waveguide where it coupled to the third optical waveguide.

4. The optical device according to claim 1, wherein
    the deformable structure comprises a first optical waveguide formed within a subset of the first predetermined portion of the layer structure which is coupled at a first end to a second waveguide formed within a subset of the second predetermined portion of the layer structure at the first predetermined location on the substrate and at a second distal end to a third waveguide formed within a second subset of the third predetermined portion of the layer structure at the second predetermined location on the substrate;
    optical signals propagating from the second waveguide are coupled to the third waveguide via the first waveguide without traversing a solid-liquid boundary or solid-gas boundary at either the first end of the first waveguide where it couples to the second waveguide and the second distal end of the first waveguide where it coupled to the third optical waveguide;
    the first optical waveguide is a first channel waveguide;
    the second optical waveguide is a second channel waveguide; and
    the third optical waveguide is a planar waveguide.

5. The optical device according to claim 4, wherein the optical component formed within the first subset of the third predetermined portion of the layer structure in the third predetermined location on the substrate is disposed within the third optical waveguide.

6. The optical device according to claim 4, wherein the optical component formed within the first subset of the third predetermined portion of the layer structure in the third predetermined location on the substrate is disposed at a distal end of the third optical waveguide to that coupled to the first optical waveguide.

7. The optical device according to claim 1, wherein
    the deformable structure comprises a first optical waveguide formed within a subset of the first predetermined portion of the layer structure which is coupled at a first end to a second waveguide formed within a subset of the second predetermined portion of the layer structure at the first predetermined location on the substrate and at a second distal end to a third waveguide formed within a second subset of the third predetermined portion of the layer structure at the second predetermined location on the substrate;
    optical signals propagating from the second waveguide are coupled to the third waveguide via the first waveguide without traversing a solid-liquid boundary or solid-gas boundary at either the first end of the first waveguide where it couples to the second waveguide and the second distal end of the first waveguide where it coupled to the third optical waveguide;
    the first optical waveguide is a first channel waveguide;
    the second optical waveguide is a second channel waveguide;
    the third optical waveguide is a planar waveguide; and
    the optical component is a diffraction grating.

8. The optical device according to claim 1, wherein
    the deformable structure comprises a first optical waveguide formed within a subset of the first predetermined portion of the layer structure which is coupled at a first end to a second waveguide formed within a subset of the second predetermined portion of the layer structure at the first predetermined location on the substrate and at a second distal end to a third waveguide formed within a second subset of the third predetermined portion of the layer structure at the second predetermined location on the substrate;

optical signals propagating from the second waveguide are coupled to the third waveguide via the first waveguide without traversing a solid-liquid boundary or solid-gas boundary at either the first end of the first waveguide where it couples to the second waveguide and the second distal end of the first waveguide where it coupled to the third optical waveguide;

the first optical waveguide is a first channel waveguide;

the second optical waveguide is a second channel waveguide;

the third optical waveguide is a planar waveguide;

the optical component is a diffraction grating;

a predetermined portion of the optical signals coupled to the third waveguide and thereby to the optical component are coupled back to the second optical waveguide via the third optical waveguide and the first optical waveguide where the predetermined portion of the optical signals varies in dependence upon a deformation induced into the deformable structure.

9. The optical device according to claim 1, further comprising one or more microelectromechanical systems (MEMS) actuators coupled to the deformable beam; wherein the deformable structure comprises a first optical waveguide formed within a subset of the first predetermined portion of the layer structure which is coupled at a first end to a second waveguide formed within a subset of the second predetermined portion of the layer structure at the first predetermined location on the substrate and at a second distal end to a third waveguide formed within a second subset of the third predetermined portion of the layer structure at the second predetermined location on the substrate;

optical signals propagating from the second waveguide are coupled to the third waveguide via the first waveguide without traversing a solid-liquid boundary or solid-gas boundary at either the first end of the first waveguide where it couples to the second waveguide and the second distal end of the first waveguide where it coupled to the third optical waveguide;

the first optical waveguide is a first channel waveguide;

the second optical waveguide is a second channel waveguide;

the third optical waveguide is a planar waveguide;

the optical component is a diffraction grating;

a predetermined portion of the optical signals coupled to the third waveguide and thereby to the optical component are coupled back to the second optical waveguide via the third optical waveguide and the first optical waveguide where the predetermined portion of the optical signals varies in dependence upon a deformation induced into the deformable structure by the one or more MEMS actuators.

10. The optical device according to claim 1, wherein the deformable structure comprises a first optical waveguide formed within a subset of the first predetermined portion of the layer structure which is coupled at a first end to a second waveguide formed within a subset of the second predetermined portion of the layer structure at the first predetermined location on the substrate and at a second distal end to a third waveguide formed within a second subset of the third predetermined portion of the layer structure at the second predetermined location on the substrate;

optical signals propagating from the second waveguide are coupled to the third waveguide via the first waveguide without traversing a solid-liquid boundary or solid-gas boundary at either the first end of the first waveguide where it couples to the second waveguide and the second distal end of the first waveguide where it coupled to the third optical waveguide;

the first optical waveguide is a first channel waveguide;

the second optical waveguide is a second channel waveguide;

the third optical waveguide is a planar waveguide;

the optical component is a diffraction grating;

a predetermined portion of the optical signals coupled to the third waveguide and thereby to the optical component are coupled back to the second optical waveguide via the third optical waveguide and the first optical waveguide where the predetermined portion of the optical signals varies in dependence upon a deformation induced into the deformable structure; and the deformable structure further comprises at least one of spoilers, absorber regions, Bragg gratings and photonic crystals disposed laterally with respect to the first optical waveguide.

11. The optical device according to claim 10, wherein the at least one of spoilers, absorber regions, Bragg gratings and photonic crystals result in at least one of:
  removal of undesired second optical signals propagating from the second optical waveguide to the third optical waveguide via the deformable structure;
  removal of undesired third optical signals propagating from the third optical waveguide to the second optical waveguide via the deformable structure; and
  removal of undesired optical signals within the deformable structure originating from the first optical waveguide arising from deformation of the deformable structure.

12. The optical device according to claim 1, further comprising
  one or more actuators to deform the deformable structure; wherein
  each actuator of the one or more actuators is one of a MEMS actuator, a mechanical actuator, an electrical actuator, a magnetic actuator, a piezoelectric actuator, a shape memory alloy element, and a thermal actuator.

13. The optical device according to claim 1, wherein
  the deformable beam is either of constant cross-section from its first end to the second distal end or of variable cross-section from its first end to the second distal end according to a predetermined profile.

14. The optical device according to claim 1, wherein
  the deformable structure comprises a first optical waveguide formed within a subset of the first predetermined portion of the layer structure which is coupled at a first end to a second waveguide formed within a subset of the second predetermined portion of the layer structure at the first predetermined location on the substrate and at a second distal end to a third waveguide formed within a second subset of the third predetermined portion of the layer structure at the second predetermined location on the substrate;

optical signals propagating from the second waveguide are coupled to the third waveguide via the first waveguide without traversing a solid-liquid boundary or solid-gas boundary at either the first end of the first waveguide where it couples to the second waveguide and the second distal end of the first waveguide where it coupled to the third optical waveguide;
a first predetermined portion of the first optical waveguide disposed towards the second optical waveguide is a first channel waveguide;
a second predetermined portion of the first optical waveguide disposed towards the third optical waveguide is a first planar waveguide;
the second optical waveguide is a second channel waveguide;
the third optical waveguide is a second planar waveguide;
the optical component is a diffraction grating;
a predetermined portion of the optical signals coupled to the third waveguide and thereby to the optical component are coupled back to the second optical waveguide via the third optical waveguide and the first optical waveguide where the predetermined portion of the optical signals varies in dependence upon a deformation induced into the deformable structure.

15. The optical device according to claim 1, wherein
the deformable structure comprises a first optical waveguide formed within a subset of the first predetermined portion of the layer structure which is coupled at a first end to a second waveguide formed within a subset of the second predetermined portion of the layer structure at the first predetermined location on the substrate and at a second distal end to a third waveguide formed within a second subset of the third predetermined portion of the layer structure at the second predetermined location on the substrate;
optical signals propagating from the second waveguide are coupled to the third waveguide via the first waveguide without traversing a solid-liquid boundary or solid-gas boundary at either the first end of the first waveguide where it couples to the second waveguide and the second distal end of the first waveguide where it coupled to the third optical waveguide;
a first predetermined portion of the first optical waveguide disposed towards the second optical waveguide is a first channel waveguide;
a second predetermined portion of the first optical waveguide disposed towards the third optical waveguide is a first planar waveguide;
the second optical waveguide is a second channel waveguide; and
the third optical waveguide is a second planar waveguide.

16. The optical device according to claim 15, wherein
the optical component is a diffraction grating;
a predetermined portion of the optical signals coupled to the third waveguide and thereby to the optical component are coupled back to the second optical waveguide via the third optical waveguide and the first optical waveguide where the predetermined portion of the optical signals varies in dependence upon a deformation induced into the deformable structure.

17. The optical device according to claim 1, wherein
the deformable structure comprises a first optical waveguide formed within a subset of the first predetermined portion of the layer structure which is coupled at a first end to a second waveguide formed within a subset of the second predetermined portion of the layer structure at the first predetermined location on the substrate and at a second distal end to a third waveguide formed within a second subset of the third predetermined portion of the layer structure at the second predetermined location on the substrate;
optical signals propagating from the second waveguide are coupled to the third waveguide via the first waveguide without traversing a solid-liquid boundary or solid-gas boundary at either the first end of the first waveguide where it couples to the second waveguide and the second distal end of the first waveguide where it coupled to the third optical waveguide;
the first optical waveguide comprises a first channel waveguide disposed towards the second optical waveguide and either a laterally multimode optical waveguide or a beam expanded optical waveguide disposed towards the third optical waveguide;
the second optical waveguide is a second channel waveguide;
the third optical waveguide is a planar waveguide.

18. The optical device according to claim 17, wherein
the optical component is a diffraction grating;
a predetermined portion of the optical signals coupled to the third waveguide and thereby to the optical component are coupled back to the second optical waveguide via the third optical waveguide and the first optical waveguide where the predetermined portion of the optical signals varies in dependence upon a deformation induced into the deformable structure.

19. The optical device according to claim 1, wherein
the deformable structure comprises a first optical waveguide formed within a subset of the first predetermined portion of the layer structure which is coupled at a first end to a second waveguide formed within a subset of the second predetermined portion of the layer structure at the first predetermined location on the substrate and at a second distal end to a third waveguide formed within a second subset of the third predetermined portion of the layer structure at the second predetermined location on the substrate;
optical signals propagating from the second waveguide are coupled to the third waveguide via the first waveguide without traversing a solid-liquid boundary or solid-gas boundary at either the first end of the first waveguide where it couples to the second waveguide and the second distal end of the first waveguide where it coupled to the third optical waveguide;
the first optical waveguide comprises a first channel waveguide disposed towards the second optical waveguide and a mode converter disposed towards the third optical waveguide;
the second optical waveguide is a second channel waveguide; and
the third optical waveguide is a planar waveguide.

20. The optical device according to claim 19, wherein
the optical component is a diffraction grating;
a predetermined portion of the optical signals coupled to the third waveguide and thereby to the optical component are coupled back to the second optical waveguide via the third optical waveguide and the first optical waveguide where the predetermined portion of the optical signals varies in dependence upon a deformation induced into the deformable structure.

* * * * *